United States Patent [19]
Gardner et al.

[11] Patent Number: 6,165,934
[45] Date of Patent: Dec. 26, 2000

[54] MATERIAL AND SYSTEM FOR CATALYTIC REDUCTION OF NITROGEN OXIDE IN AN EXHAUST STREAM OF A COMBUSTION PROCESS

[75] Inventors: Timothy J. Gardner, Albuquerque; Stephen E. Lott, Edgewood; Steven J. Lockwood; Linda I. McLaughlin, both of Albuquerque, all of N. Mex.

[73] Assignee: Low Emissions Technologies Research and Development Partnership, Dearborn, Mich.

[21] Appl. No.: 09/185,149

[22] Filed: Nov. 3, 1998

Related U.S. Application Data

[63] Continuation-in-part of application No. 08/675,065, Jul. 3, 1996, Pat. No. 5,830,421.

[51] Int. Cl.$^7$ .............................. B01J 23/42; B01J 23/44; B01J 23/72
[52] U.S. Cl. ........................... 502/330; 502/325; 502/331; 502/332; 502/333; 502/334; 502/339; 502/527.15
[58] Field of Search ..................................... 502/325, 330, 502/331, 339, 332, 333, 334, 527.15

[56] References Cited

U.S. PATENT DOCUMENTS

| | | | |
|---|---|---|---|
| 4,293,449 | 10/1981 | Herrington et al. | 423/628 |
| 4,511,455 | 4/1985 | Dosch et al. . | |
| 4,769,356 | 9/1988 | Tekeuchi et al. . | |
| 4,929,582 | 5/1990 | Dosch et al. . | |
| 5,233,830 | 8/1993 | Takeshima et al. . | |
| 5,461,022 | 10/1995 | Dosch et al. . | |
| 5,795,553 | 8/1998 | Lott et al. | 422/180 |
| 5,830,421 | 11/1998 | Gardner et al. | 502/339 |
| 5,916,838 | 6/1999 | Wulff-Doring et al. | 502/326 |

OTHER PUBLICATIONS

H. S. Gandhi and M. Shelef, "The Adsorption of Nitric Oxide on Copper Oxides," 28 *Journal of Catalysis* 1 (1973), no month available.

Kathleen A. Bethke, David Alt, and Mayfair C. Kung, "NO Reduction by Hydrocarbons in an Oxidizing Atmosphere over Transition Metal–Zirconium Mixed Oxides," 35 *Catalysis Letters* 37 (1994), no month available.

K. A. Bethke, C. Li, M.C. Kung, B. Yang, and H. H. Kung, "The Role of $NO_2$ in the Reduction of NO by Hydrocarbon over $Cu-ZrO_2$ and CU–ZSM–5 Catalysts," 31 *Catalysis Letters* 287 (1995), no month available.

T. –R. Viljava et al., "Dry adsorption processes for removal of $SO_x$ and $NO_x$ in flue gases—a review," 5 Paperi ja Puu 401 (1986). no month available.

A. A. Siddiqi et al., "$NO_x$ controls in review," Hydrocarbon Processing, 115 (1981). no month available.

T. J. Truex et al., "Catalysts for Nitrogen Oxides Control under Lean Burn Conditions," 36(1) Plat. Met. Rev., 2 (1992). no month available.

S. Sato et al., "Iron ion–exchanged zeolite: the most active catalyst at 473 K for selective reduction of nitrogen monoxide by ethene in oxidizing atmosphere," 12 Catal. Lett. 193 (1992). no month available.

W. Held et al., "Catalytic NOx Reduction in Net Oxidizing Exhaust Gas," SAE Technical Paper No. 900496, 13 (1990). no month available.

A. Obuchi et al., "Performance of platinum–group metal catalysts for the selective reduction of nitrogen oxides by hydrocarbons," Appl. 2 Catal. B, 71 (1993). no month available.

H. K. Shin et al., "Selective catalytic reduction of NO by ethene in excess oxygen over platinum ion–exchanged MFI zeolites," 26 Catal. Today, 13 (1995). no month available.

A. Takami et al., "Development of Lean Burn Catalyst," SAE Technical Paper No. 950746, 1 (1995). no month available.

K.C.C. Kharas et al., "Deactivation of PT–ZSM–5 For Selective Reduction Of NO," 40[4] Prepr. Am. Chem. Soc., Fuel Chem. Div. 1068 (1995). no month available.

R. Burch et al., "The effect of promoters on $Pt/Al_2O_3$ catalysts for the reduction of NO by $C_3H_6$ under lean–burn conditions," 11 Appl. Catal. B. 207 (1997). no month available.

W. Bogner et al., "Removal of nitrogen oxides from the exhaust of a lean–tune gasoline engine," 7 App. Catal. B 153 (1995). no month available.

N. Takahashi et al., "The new concept of 3–way catalyst for automotive lean–burn engine: $NO_x$ storage and reduction catalyst," 27 Catalysis Today, 27 63 (1996). no month available.

M. D. Amiridis, et al. "Selective catalytic reduction of nitric oxide by hydrocarbons," 10 App. Catal. B, 203 (1996). no month available.

*Primary Examiner*—Elizabeth D. Wood
*Attorney, Agent, or Firm*—Harness, Dickey & Pierce, P.L.C.

[57] ABSTRACT

Disclosed is a catalytic material of a calcined noble metal-doped hydrous titanium oxide with a copper promoter compound. The catalytic material is effective for $NO_x$ reduction in an oxidizing exhaust stream form a combustion process is disclosed. Also described is a device for reduction of nitrogen oxides in an exhaust stream, particularly an automotive exhaust stream, that includes a substrate coated with the activated noble-metal doped hydrous metal oxide of the invention and methods for preparing the device.

23 Claims, 14 Drawing Sheets

Example 5

Example 7

Example 9

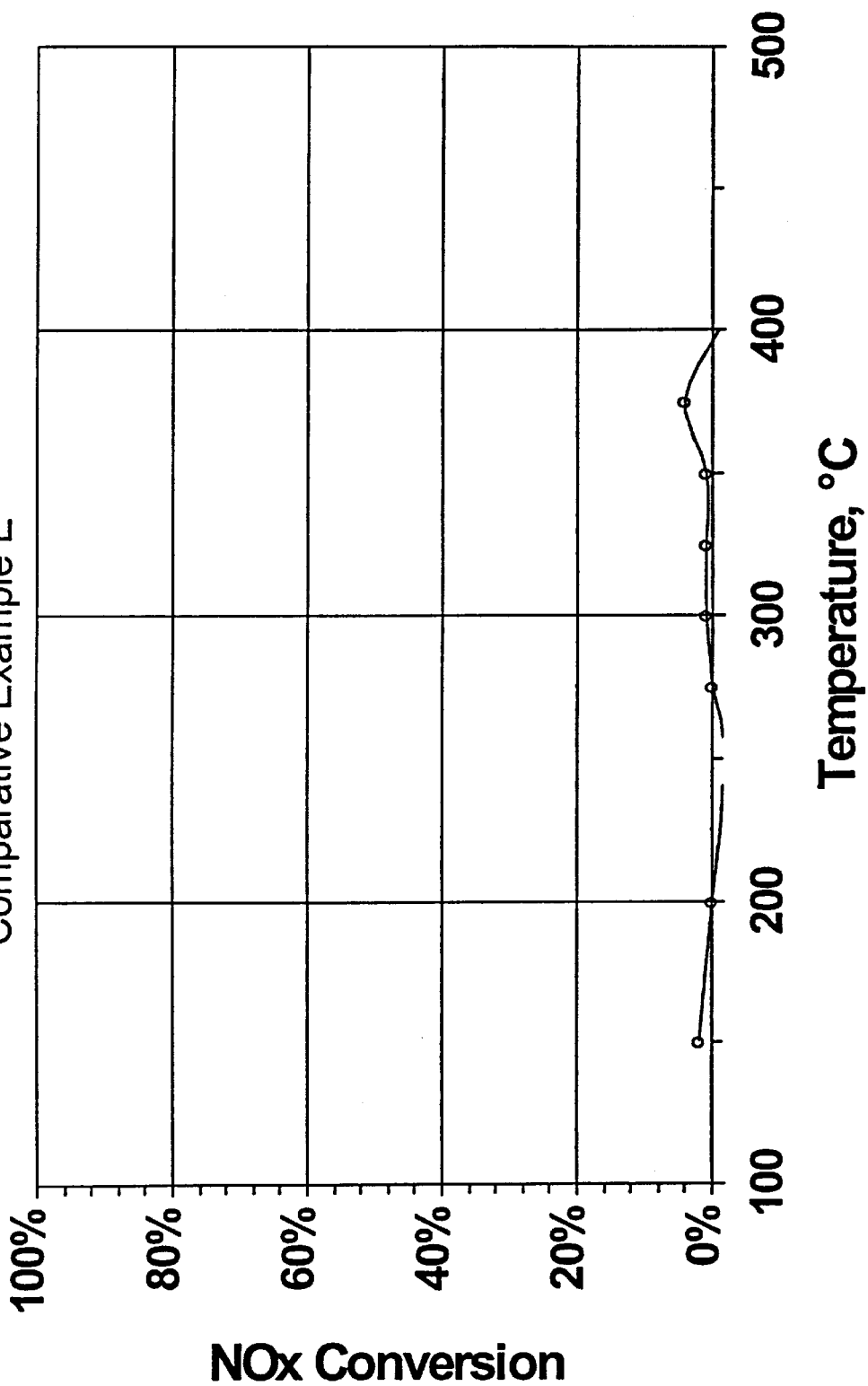

MATERIAL AND SYSTEM FOR CATALYTIC REDUCTION OF NITROGEN OXIDE IN AN EXHAUST STREAM OF A COMBUSTION PROCESS

This is a continuation-in-part of U.S. patent application Ser. No. 08/675,065, filed Jul. 3, 1996, now U.S. Pat. No. 5,830,421.

GOVERNMENT RIGHTS

The U.S. Government may have rights in this invention.

FIELD OF THE INVENTION

This invention relates to devices to reduce nitrogen oxides in an exhaust or effluent stream from a combustion process, such as from an internal combustion engine, and, in particular, to a device in a combustion apparatus having a substrate coated with an activated noble metal-doped hydrous metal oxide material, which may include a copper promoter, that is capable of reducing the nitrogen oxides in the exhaust stream to nitrogen.

BACKGROUND OF THE INVENTION

Certain compounds in the exhaust stream of a combustion process, such as the exhaust stream from an internal combustion engine, are undesirable in that they must be controlled in order to meet government emissions regulations. Among the regulated compounds are nitrogen oxide compounds ($NO_x$), hydrocarbons, and carbon monoxide. There are a wide variety of combustion processes producing these emissions, for instance, coal- or oil-fired furnaces, reciprocating internal combustion engines (including gasoline and diesel engines), gas turbine engines, and so on. In each of these combustion processes, control measures to prevent or diminish atmospheric emissions of $NO_x$, hydrocarbons, and carbon monoxide are needed.

Industry has devoted considerable effort to reducing regulated emissions from the exhaust streams of combustion processes. In particular, it is now usual in the industry to place a catalytic converter in the exhaust system of gasoline engines to remove undesirable emissions from the exhaust by chemical treatment. Typically, a "three-way" catalyst system of platinum, palladium, and rhodium metals dispersed on an oxide support is used to oxidize carbon monoxide and hydrocarbons to water and carbon dioxide and to reduce nitrogen oxides to nitrogen. The catalyst system is applied to a ceramic substrate such as beads, pellets, or a monolith. When used, beads are usually porous, ceramic spheres having the catalyst metal impregnated in an outer shell. The beads or pellets are of a suitable size and number in the catalytic converter in order to place an aggregate surface area in contact with the exhaust stream that is sufficient to treat the compounds of interest. When a monolith is used, it is usually a cordierite honeycomb monolith and may be precoated with γ-alumina and other specialty oxide materials to provide a durable, high surface area support phase for catalyst deposition. The honeycomb shape, used with the parallel channels running in the direction of the flow of the exhaust stream, both increases the surface area exposed to the exhaust stream and allows the exhaust stream to pass through the catalytic converter without creating undue back pressure that would interfere with operation of the engine.

When a gasoline engine is operating under stoichiometric conditions or nearly stoichiometric conditions with respect to the fuel:air ratio (Oust enough oxygen to completely combust the fuel, or perhaps up to 0.3% excess oxygen), a "three-way" catalyst has proven satisfactory for reducing emissions. Unburned fuel (hydrocarbons) and oxygen are consumed in the catalytic converter, and the relatively small amount of excess oxygen does not interfere with the intended operation of the conventional catalyst system. The stoichiometric conditions or nearly stoichiometric conditions will be referred to as non-oxidizing conditions or as producing a non-oxidizing atmosphere.

However, it is desirable to operate the engine at times under lean burn conditions, with excess air, in order to improve fuel economy. While conventional non-oxidizing engine conditions might have a fuel:air ratio having 0.1–0.3% excess oxygen, a lean burn engine has a substantially greater excess of oxygen, from about 1% to perhaps up to 10% excess oxygen relative to the amount of fuel. Under lean burn conditions, conventional catalytic devices are not very effective for treating the $NO_x$ in the resulting oxygen-rich exhaust stream. Lean burn conditions will be referred to as oxidizing conditions or as producing an oxidizing atmosphere.

The exhaust stream from a diesel engine also has a substantial oxygen content, from perhaps about 2–18% oxygen. It is also believed that other combustion processes result in emissions of $NO_x$, hydrocarbons, and carbon monoxide that are difficult or expensive to control because of an oxidizing effluent stream or poor conversion of the compounds using conventional means.

In spite of efforts over the last decade to develop a catalytic converter effective for reducing $NO_x$ to nitrogen under oxidizing conditions in a gasoline engine or in a diesel engine, the need for improved conversion effectiveness has remained unsatisfied. The materials developed prior to the present invention have exhibited unacceptably low efficiencies for reduction of $NO_x$ in an oxidizing exhaust stream, even with such high levels of expensive noble metal catalysts as to make them impractical for use by the automotive industry. Moreover, there is a continuing need for improved effectiveness in treating $NO_x$, hydrocarbons, and carbon monoxide emissions from any combustion process.

The industry has also been concerned with the related problem of the temperatures at which catalytic converter devices are effective for reducing nitrogen oxides and other emissions. Typically, $NO_x$ reduction catalysts are evaluated by the maximum $NO_x$ conversion of the catalyst and the temperature at which that maximum occurs. Automotive exhaust catalysts are expected to perform over a wide range of operating temperatures encompassing cold start (i.e., start when the engine is at ambient temperature) to wide-open throttle conditions. For this reason, a catalyst having a higher peak $NO_x$ reduction performance occurring at one certain temperature may not decrease $NO_x$ emissions as much during the whole period of engine operation as a catalyst having a lower peak $NO_x$ reduction performance but having a wider temperature window over which it has high $NO_x$ reduction activity. Another consideration is the temperature required for a particular catalyst to have any appreciable activity. The standard "three-way" catalyst system is ineffective for treating emissions until a temperature of approximately 250° C., the light-off temperature of the catalyst system, is reached. This threshold temperature for effective operation of the catalytic converter is often referred to as the "light-off" temperature. It would be desirable to reduce the light-off temperature as much as possible because significant amounts of emissions are produced from the time when the engine is started until the catalytic converter is finally heated to the light-off temperature. In addition, diesel engines and engines that are run under lean burn (oxidizing) conditions have lower average exhaust temperatures, usually in the range of about 150 to 350° C. The conventional three-way catalytic converter systems reach maximum efficiency at temperatures between 400 and 800° C., above the operating temperature ranges of these engines.

We have discovered that a coating of an activated noble metal-doped hydrous metal oxide material on a substrate unexpectedly improves the conversion of nitrogen oxides to nitrogen under oxidizing conditions. The coated substrates of the invention also exhibit reduced light-off temperatures over conventional catalytic converters and can be synthesized to provide maximum effectiveness in the operating temperature ranges of diesel engines and of lean-burn gasoline engines.

BRIEF DESCRIPTION OF THE DRAWINGS

FIGS. 11–14 illustrate $NO_x$ conversion test results for the devices of Comparative Examples A–E.

SUMMARY OF THE INVENTION

Figure 1:
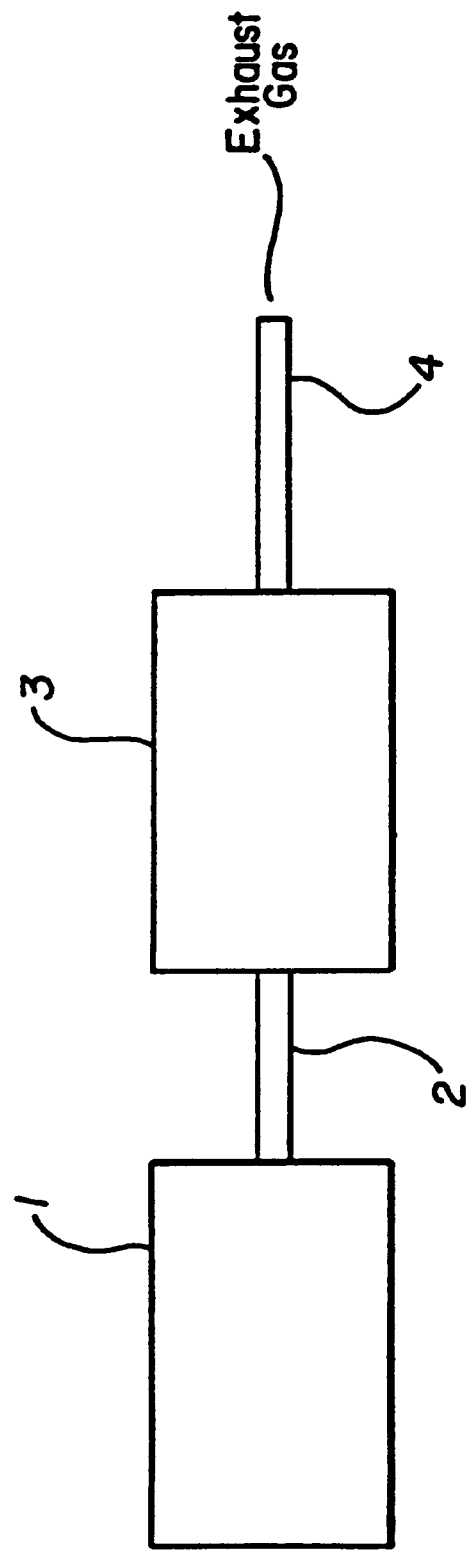
FIG. 1 illustrates a preferred configuration for exhaust systems of the invention.

According to the present invention, there is provided material and a device for reducing $NO_x$ in an exhaust stream from a combustion process. The material and device of the invention are particularly useful for $NO_x$ conversion under oxidizing conditions. In addition, the material and device are also useful for catalyzing the oxidation of hydrocarbons and carbon monoxide. While not wishing to be bound by theory, it is believed that the conversion of the $NO_x$, hydrocarbon, and carbon monoxide emissions take place together, and perhaps in interrelated reactions, so that the $NO_x$ can be reduced and hydrocarbons and carbon monoxide oxidized in the same operation.

The material is a catalytic material comprising an activated noble metal-doped hydrous metal oxide. The activated noble metal-doped hydrous metal oxide is prepared in a coated form on a substrate. The coated substrate may be prepared according to one of two methods. The first method is a direct coating method in which a precursor to the activated noble metal-doped hydrous metal oxide is coated onto the substrate, and further steps to synthesize the final activated catalyst are conducted after the coating step. The second method is powder slurry method, in which a substrate is coated with a slurry containing an activated noble metal-doped hydrous metal oxide powder. The second method comprises the steps of preparing the activated noble metal-doped hydrous metal oxide powder, forming an aqueous slurry of the powder, coating the substrate with the slurried powder, and calcining the coated substrate.

The invention further provides an activated noble metal-doped hydrous metal oxide material that includes an amount of sodium effective to broaden the temperature range of appreciable $NO_x$ conversion and a method for making such a material. Yet further, the invention provides a catalytic material comprising an activated noble metal-doped hydrous metal oxide material that includes an amount of silica effective to thermally stabilize the material for temperatures of up to about 1000° C.

Another embodiment of the invention provides a catalyst for $NO_x$ reduction that is a copper-modified noble metal-doped hydrous metal oxide material, especially a copper-modified platinum-doped hydrous titanium oxide/silica. The copper acts as a promoter for the noble metal-doped hydrous metal oxide material, with the combination resulting in a catalyst having a wider temperature window of appreciable $NO_x$ reduction without sacrificing activity at higher temperatures compared to the noble metal-hydrous metal oxide material without copper promoter. Surprisingly, the copper-modified noble metal-doped hydrous metal oxide also provides a lower light-off temperature relative to the noble metal-doped hydrous metal oxide without the copper modification.

The materials and devices of the invention comprise a substrate coated with an activated noble metal-doped hydrous metal oxide, with the noble metal being selected from platinum, palladium, and mixtures of platinum and palladium, and with the metal of the metal oxide being selected from zirconium, titanium, niobium, tantalum, and mixtures of these transition metals. The transition metal oxide material preferably contains silica to provide high-temperature stability. The activated noble metal-doped hydrous metal oxide material may contain up to about 5% by weight sodium and/or up to about 5% by weight copper promoter in order to broaden the temperature range of appreciable $NO_x$ conversion.

The substrate for the coating is preferably ceramic beads or pellets or a ceramic monolith. The substrate is preferably a cordierite honeycomb monolith. The monolith may optionally be precoated with γ-alumina or another high-surface area ceramic when the catalyst of the invention is introduced by the direct coating method. If the catalyst is introduced by the powder slurry method, then γ-alumina or another suitable binder may be included in the slurry instead of being precoated on the monolith.

The devices with the coatings of the invention effectively reduce the nitrogen oxide emissions in oxidizing exhaust streams of engines and other combustion processes, and offer the further advantage of lower light-off temperatures for conversion of emissions in the exhaust stream.

The present invention further provides a method of reducing $NO_x$ in the exhaust stream of an internal combustion engine by placing the device of the invention in contact with the exhaust stream, and an automotive exhaust emission control system.

DETAILED DESCRIPTION OF THE INVENTION

The devices according to the invention comprise a substrate coated with an effective amount of an activated noble metal-doped hydrous metal oxide material. The noble metal is selected from platinum, palladium, or a mixture of platinum and palladium. The metal of the metal oxide is a transition metal selected from zirconium, titanium, niobium, tantalum, and mixtures of these metals. The activated, noble metal-doped hydrous metal oxide material is capable of catalyzing the reduction of $NO_x$ to nitrogen and of facilitating oxidation of hydrocarbon and carbon monoxide. While not in any way limiting our invention by the theory of operation, we believe that the hydrous metal oxide materials of the invention exhibit improved $NO_x$ reduction capability at least in part because of the increased surface area and increased number of active metal sites on the surface of these materials as compared to the materials currently used in catalytic converters for internal combustion engines. The substrates of the present invention coated with the activated hydrous metal oxide materials are effective for reducing $NO_x$ from the exhaust stream even with relatively low amounts of the expensive noble metals.

In general, the activated hydrous metal oxide material is prepared through a first step of forming an intermediate sol in a lower alcohol by the reaction of an alkali or alkaline earth metal hydroxide dissolved in the lower alcohol with a transition metal alkoxide. The alcohol used preferably has up to 8 carbon atoms, more preferably up to 4 carbon atoms, and it is particularly preferred to use methanol. The intermediate is then hydrolyzed to form a hydrous metal oxide containing the alkali or alkaline earth metal cation. An ion exchange of the hydrous metal oxide with the doping noble metal or metals follows, and, finally, the doped material is calcined to activate the noble metal-doped hydrous metal oxide material. General preparative procedures for catalytic hydrous metal oxide materials are described in Dosch et al., U.S. Pat. No. 4,511,455, Dosch et al., U.S. Pat. No. 4,929,582, and Dosch et al., U.S. Pat. No. 5,461,022, the entire contents of all three patents now being incorporated herein by reference.

The activated noble metal-doped hydrous metal oxide material may be introduced onto a substrate, such as ceramic beads or a cordierite monolith optionally precoated with γ-alumina, by one of at least two methods. In the first method, hereinafter referred to as the powder slurry method, an aqueous slurry is made of an activated noble metal-doped hydrous metal oxide powder, and is contacted with the target substrate. The first method has the advantage of having the same steps for the manufacturer of ceramic substrates for automotive catalytic converters as methods already used in the industry. The disadvantage of the first method is that thicker films result, using more of the expensive catalyst metals.

For example, the beads or cordierite monolith, with or without the γ-alumina coating, can be coated by the powder slurry method by pouring a slurry, preferably an aqueous slurry, of the activated noble metal-doped hydrous metal oxide material onto the beads or into the channels of the monolith, pulling the slurry through to the other ends of the channel with vacuum at a rate chosen to deposit the desired thickness of coating. The slurry may be formulated in a range of solids content, with, for example, slurries of from about 40% to about 60% by weight solids being conveniently used. The composition of the slurry can include, in addition to the activated noble metal-doped hydrous metal oxide powder and water, appropriate binders and dispersion agents. Suitable binders include, without limitation, γ-alumina, dispersible alumina gel, colloidal silica liquid, and combinations thereof. Suitable dispersion agents include, without limitation, strong mineral acids such as nitric acid. Slurry formulations made with other catalysts are well-known in the art and can be adapted for use with the catalysts of the invention. The concentration of the active phase of the phase of the catalyst in the slurry can be varied. The desired amount of catalyst can be deposited on the monolith, for example by using a slurry with a higher concentration of the catalyst or by applying multiple layers of the slurry onto the monolith to build up the desired coating thickness. The applied coating is allowed to dry. Drying is preferably accomplished by heating the beads or monolith to about 100° C. under stagnant or forced air conditions. After drying, the applied coating is calcined, preferably by heating the coated substrate to between from about 300 to about 500° C., and particularly preferably at about 425° C., and holding at that temperature for up to 5 hours, preferably 1 hour, thereby producing the final coated substrate.

In the second method, hereinafter referred to as the direct coating method, the target substrate is coated with the solution of the intermediate sol. After removal of excess sol, the sol-coated surface is hydrolyzed, preferably by exposure to atmospheric moisture, to form an alkali- or alkaline earth-doped hydrous metal oxide coating. The steps of ion exchange and activation can then be performed to produce an activated noble metal-doped hydrous metal oxide material. The direct coating method is described in Dosch et al., U.S. Pat. No. 5,461,022, and reference is made thereto for further details. The coating deposited by the direct coating method is thinner than with the powder slurry method, resulting in use of a lesser amount of the expensive catalyst metal and metal alkoxides. The direct coating method may also allow a higher dispersion of the metal catalyst particles and a synergism between the hydrous metal oxide coating and the substrate. The disadvantage of the direct coating method is that more process steps (and perhaps more time and equipment) would be required of the manufacturer of the beads or monoliths for catalytic converters.

In particular, the preparation of the preferred embodiments according to the present invention is as follows. All percentages are by weight, based on the weight of the final activated (calcined) noble metal-doped hydrous metal oxide compound or activated noble metal-doped hydrous metal oxide coated substrate, unless expressly stated otherwise. In a first step, an intermediate sol in a lower alcohol is formed by the reaction of an alkali or alkaline earth metal hydroxide dissolved in the lower alcohol with a transition metal alkoxide. Useful transition metal alkoxides include those wherein each alkoxide ligand has up to 8, preferably up to 4, carbon atoms, for example, titanium methoxide, titanium ethoxide, titanium n-propoxide, titanium isopropoxide, titanium n-butoxide, titanium isobutoxide, titanium sec-butoxide, titanium tert-butoxide, titanium 2-ethylhexoxide, zirconium methoxide, zirconium ethoxide, zirconium n-propoxide, zirconium isopropoxide, zirconium n-butoxide, zirconium isobutoxide, zirconium sec-butoxide, and zirconium tert-butoxide. Further useful alkoxide compounds are listed in Dosch et al., U.S. Pat. No. 4,511,455 and Dosch et al., U.S. Pat. No. 5,461,022. The transition metal alkoxide may also have mixed ligands. Titanium alkoxide compounds are commercially available from DuPont under the trademark TYZOR®. The transition metal methoxide is selected from titanium methoxide, zirconium methoxide, niobium methoxide, and tantalum methoxide. Titanium methoxide and zirconium methoxide are preferred. The transition metal methoxide may be used as a starting material or may be formed in situ in the methanol reaction solvent by using a higher alkoxide. The compounds with alkoxide ligands having three or four carbon atoms are preferred due to easier handling characteristics such as higher flash points and lower toxicity.

It is particularly preferred for some applications to include silicates, such as tetraalkylorthosilicates, in the synthesis of the hydrous metal oxide materials. When the activated noble metal-doped hydrous metal oxide material further includes silica, the material has greater thermal stability, being stable at temperatures of up to 1000° C. One preferred silicate is tetraethylorthosilicate. The silicate material is mixed with the transition metal alkoxide prior to the reaction with the alkali or alkaline earth metal hydroxide. While the theory of how the silica functions in the hydrous metal oxide material is unimportant to making and using the invention, it is believed that the presence of silica inhibits metal oxide particle growth and high temperature crystallization to prevent loss of surface area. This can be beneficial when the device is used for treating the exhaust stream from an automotive engine because of possible temperature spikes under certain conditions, such as engine misfire, at which times the device of the present invention might experience temperatures as high as 1000° C. for a brief period of time. When silica is included, it may be included in a molar ratio of transition metal to silicon of from about 4:1 to about 6:1. A preferred ratio is 5 moles of transition metal, preferably of titanium or zirconium, to 1 mole of silicon. The tetraalkylorthosilicate is mixed with the transition metal alkoxide, alcohol, and hydroxide to produce a co-network with silicon-oxygen, transition metal-oxygen, and silicon-oxygen-transition metal bonds.

The hydroxide used is selected from alkali metal, alkaline earth metal, and ammonium hydroxides. Preferred hydroxides include sodium hydroxide, potassium hydroxide, lithium hydroxide, ammonium hydroxide, tetramethyl ammonium hydroxide, barium hydroxide, calcium hydroxide, and strontium hydroxide. Sodium hydroxide is particularly preferred. The alkali metal, alkaline earth metal, or ammonium hydroxide is dissolved in the methanol, preferably at approximately 10% by weight. The exact concentration is not critical, but an excess of the methanol helps to facilitate both the alcohol exchange reaction and the reaction between the transition metal alkoxide and tetraalkylorthosilicate, as well as enhance solubility of the intermediate. The transition metal alkoxide or alkoxide mixture is added to the alkali or alkaline earth metal or ammonium solution in a molar ratio of about one mole of alkali or alkaline earth metal to from about 2 to about 10 moles, preferably from about 2 to about 3 moles, and particularly preferably about 2.0 moles total of transition metal. The addition is carried out at temperatures up to the boiling point of the solution. The rate of addition is not critical. The alkoxides may be added slowly enough to prevent boiling, or, alternatively, the exotherm may be dissipated by cooling during the reaction, for example by placing the container holding the solution in a water bath, by use of a cooling jacket, or by making the addition in a reactor fitted with a reflux condenser. The reaction is facile and is complete or essentially complete after a couple of minutes with stirring.

The intermediate produced by this reaction is then hydrolyzed. The hydrolysis for the powder slurry method is generally effected by pouring the intermediate solution into water or a mixture of water with other ingredients. Preferably, the intermediate solution is poured into a mixture of water in acetone, for example a mixture of about 11% by weight water in acetone. While the particular ratio of water to acetone is not critical, there is preferably a sufficient amount of water to hydrolyze all of the intermediate that is added. Acetone is one preferred material to use with the water because it aids in the agglomeration of the product and is easily removed in a later drying step. Of course, other water soluble or water miscible organic solvents may be used instead of or in addition to the acetone. The intermediate is added to the water or aqueous mixture with stirring. The hydrolysis of the intermediate to an agglomerated alkali or alkaline earth metal-doped hydrous metal oxide material is complete or essentially complete at room temperatures after a couple of minutes with stirring.

When the direct coating method is used, the substrate to be coated, such as beads or a cordierite monolith, may first be soaked in an excess of the soluble intermediate for up to about 24 hours, taking care to remove any trapped air. The excess sol may be removed by draining, inert gas purging, vacuum filtration, or other means. The coated material may be hydrolyzed by exposure to ambient moisture. The moisture content of ambient air is usually sufficient to hydrolyze the alkoxides present in the sol coating. It is also possible to carry out the hydrolysis by contact with liquid water or with a combination of water and an organic solvent, preferably a highly volatile organic solvent such as acetone, especially acetone mixtures containing up to about 15% water, in a manner similar to the hydrolysis described for the powder slurry method. The excess water or water/solvent mixture may be removed by any of the means mentioned above for removing the excess sol.

Following hydrolysis, the alkali or alkaline earth metal ions or ammonium ions are exchanged for the desired noble metal ions. The noble metal is selected from platinum, palladium, and mixtures of these metals. Platinum or combinations of platinum with palladium are particularly preferred. For activated coated substrates prepared using the powder slurry method, it is preferred to include up to about 10% of the noble metals, preferably including platinum and particularly preferably a combination of platinum and palladium, based on the final weight of the activated noble metal-doped hydrous metal oxide powder. Following deposition of the slurry coating on the substrate by the powder slurry method, it is preferably that from about 0.2 to about 2.0%, and even more preferably from about 0.4 to about 1.5% of the noble metal is included, based on the final weight of the activated coated substrate. When the activated coated substrates are prepared according to the direct coating method, it is preferred to include up to about 2% of the noble metal, preferably platinum, based on the final weight of the activated coated substrate. More preferably, from about 0.2 to about 1.8%, and even more preferably from about 0.4 to about 1.5% of the noble metal, particularly platinum, is included, based on the final weight of the activated coated substrate.

In a particularly preferred embodiment, the platinum and palladium are used together. In both the powder slurry and direct coating methods, the addition of small amounts of palladium relative to platinum may be used to reduce the light-off temperature. For example, light-off temperatures of 150–165° C. can be obtained in this way. When used together, regardless of the coating method, it is preferable to incorporate the platinum and palladium in a ratio of from about 1 to about 20 parts platinum for each part palladium, by weight. A more preferred ratio is from about 2 to about 12 parts platinum for each part palladium, by weight, and a ratio of from about 2 to about 10 parts platinum for each part palladium, by weight, is particularly preferred. For example, one particularly preferred embodiment prepared according to the powder slurry method and having a substantially lower light-off temperature, as compared to a platinum-only doped powder, contains from about 0.7 to about 1.0% platinum and from about 0.1 to about 0.4% palladium, based on the final weight of the activated coated substrate. Yet another particularly preferred embodiment prepared according to the powder slurry coating method contains about 0.75% platinum and about 0.25% palladium, based on the final weight of the activated coated substrate. Correspondingly, it is particularly preferred to prepare a coated substrate according to the direct coating method with from about 0.7 to about 1.1% platinum and up to about 0.5% palladium, based on the final weight of the activated coated substrate. Especially preferred is a coated substrate containing from about 0.8 to about 1.1% platinum and up to about 0.2% palladium, based on the final weight of the activated coated substrate.

The noble metal catalyst is prepared by incorporating a noble metal cationic or anionic precursor by cation or anion exchange, respectively. Suitable compounds that can be used as the source of the noble metal cationic precursor include tetraammineplatinum nitrate, tetraamminepalladium nitrate, tetraamminepalladium chloride monohydrate, tetraammineplatinum chloride monohydrate, and palladium metal dissolved in a aqua regia. An example of a suitable compound that can be used as the source of the noble metal anionic precursor is hydrogen hexachloroplatinate hydrate. A noble metal cation is usually added by dissolving the salt in water, adding the alkali or alkine earth metal-doped hydrous metal oxide in powder or coated substrate form, bringing the pH to from about to about 7.0 or less, preferably to a pH of about 5.5, and holding at the pH for a sufficient time, preferably for about 30 minutes, to allow the desired extent of ion exchange. When the noble metal is added by anion exchange, a two-step procedure is used. The alkali or alkaline earth metal-doped hydrous metal oxide, in powder form or coated on a substrate, is added to water, and the pH is adjusted to between about 2.0 and about 3.0, preferably to a pH of about 2.5, and maintained at the desired pH for preferably about 30 minutes. The acidified powder is filtered and redispersed, after which the noble metal anionic precursor is added to the water. Again, the pH is held for a sufficient time, preferably for about 30 minutes, to allow the desired extent of ion exchange. The pH is preferably adjusted with a mineral acid, such as 10 wt. % hydrochloric acid or nitric acid. Following the exchange, the aqueous solution is removed and the powder or coated substrate is washed with water and then with acetone and dried. The amount of catalyst metal ion uptake can be determined by atomic absorption spectrometry.

After the ion exchange step, the powder or coated substrate may be acidified by placing in water and adjusting the pH to the desired value. The pH is held at the desired value for a period of time, preferably between 1 and 5 minutes, during which time the pH is adjusted with acid as needed. After the acidification step, the product is removed from the water and is rinsed with deionized water and then, preferably, rinsed with acetone or a similar solvent to aid in drying.

It is particularly preferred to use this acidification procedure to produce activated platinum, palladium, or platinum and palladium doped hydrous metal oxide materials with sodium contents of up to 1% sodium, preferably less than about 0.5% sodium.

It is sometimes advantageous, particularly for the purpose of controlling the width of the temperature range of appreciable effective $NO_x$ conversion for the inventive materials, to retain or reintroduce at least some alkali or alkaline earth metal in the activated noble metal-doped hydrous metal oxide materials. While it has been determined that adding sodium or another alkali or alkaline earth metal will slightly decrease the maximum potential $NO_x$ conversion, the temperature range for the appreciable conversion can be broadened for at least up to about a 50° C. span, preferably up to at least about a 100° C. span, and particularly preferably at least up to about a 150° C. span. In this context, the temperature range of "appreciable $NO_x$ conversion" means the temperature range that includes the particular temperature at which the maximum value is observed, plus all the temperatures at which the $NO_x$ reduction value is at least about 75% of the maximum value.

Alkali metals are preferred for this purpose and it is particularly preferred that the metal incorporated is sodium, and preferably enough sodium is incorporated into the activated hydrous metal oxide or hydrous metal oxide/silica material to broaden the temperature range of appreciable $NO_x$ conversion to a range of at least about 50° C. It is particularly preferred to incorporate enough sodium to broaden the temperature range of appreciable $NO_x$ conversion to a range of at least about 100° C.

The amount of alkali or alkaline earth metal in the material can be monitored by atomic absorption spectrometry and controlled by adjusting the pH at which the ion exchange step is carried out or by limiting the amount of acidification during the acidification step after the ion exchange, or by both methods. Up to perhaps half of the original amount of alkali or alkaline earth metal may be retained in the hydrous metal oxide material after ion exchange. The proper conditions to obtain a material with the desired amount of alkali or alkaline earth metal may easily be determined by analyzing for the metal by atomic absorption spectrometry. The alkali or alkaline earth metal may also be increased after the ion exchange step by an incipient wetness impregnation procedure. In such a procedure, the alkali or alkaline earth metal cation is introduced by addition of an aqueous solution of a salt of that metal, such as by the addition of the corresponding nitrate salt or the corresponding hydroxide form. The sodium or other alkali or alkaline earth metal cation solution is mixed with the noble metal-doped hydrous metal oxide material, and the mixture is allowed to equilibrate. The time allowed for equilibration at room temperature is preferably at least eight hours. Following the equilibration, the sodium- or other alkali metal- or alkaline earth metal-doped material is dried.

As mentioned, it is particularly preferred to include sodium in the activated noble metal-doped hydrous metal oxide material, especially when both platinum and palladium are included. Up to about 5% sodium is included in the material. The sodium content is preferably from about 1 to about 5%, and particularly preferably from about 2 to about 4%, by weight of the activated noble metal-doped hydrous metal oxide material, and it is particularly preferred to use these ranges of sodium with a platinum-doped or a platinum- and palladium-doped hydrous metal oxide material.

In the powder slurry method, after the ion exchange step and any further steps to adjust the sodium or other alkali or alkaline earth metal content, the reaction mixture is filtered using a Buchner funnel to recover the noble metal-doped product. The powder is ground, if necessary, to a −60/+80 mesh particle size range.

The powder or coated substrate is then calcined, for example by heating at about 600° C. for from about 1 to about 3 hours. The noble metal precursor and the hydrous metal oxide are converted during the calcination to crystallized metal particles and metal oxide phases. The calcined material is what is referred to as the activated noble metal-doped hydrous metal oxide material.

In a particularly preferred embodiment, a copper precursor is incorporated into the calcined noble metal-doped hydrous metal oxide and the copper impregnated catalyst is then subjected to a second calcination procedure to produce a noble metal-doped hydrous metal oxide with a copper promoter. For the powder slurry method, the copper impregnation and second calcination steps can be carried out either before or after slurry coating the substrate. For activated coated substrates prepared using either the powder slurry or direct coating method, it is preferable that the copper concentration range from about 0.1% to about 10% by weight, and more preferably from about 0.1% to about 5% by weight, with a concentration of about 0.2% to about 2% by weight being particularly preferred, based on the weight of the final activated coated substrate. The preferred platinum or platinum and palladium concentrations remain the same as for the material that has not been modified with the copper promoter. Silica and alkali metal or alkaline earth metal, particularly sodium, may also be included in the same amounts described above.

Suitable compounds that can be used as the source of the copper include, without limitation, copper nitrate, copper acetate, copper chloride, and copper sulfate. Copper nitrate is particularly preferred. The copper precursor addition may conveniently be made by impregnation by an aqueous solution of the copper salt. In this method, the calcined bulk powder of the noble metal-doped hydrous metal oxide or the substrate coated with the activated (calcined) noble metal-doped hydrous metal oxide is wetted with a solution, preferably an aqueous solution, of a copper salt and then is allowed to dry. Drying may be carried out at ambient temperatures or with mild heating, e.g. at about 100° C. in air. After drying, a second calcination is carried out to provide the final copper modified noble metal-doped hydrous metal oxide or hydrous metal oxide/silica catalyst. As in the first calcination, calcination of the copper-impregnated catalyst may be carried out, for example by heating at about 600° C. for from about 1 to about 3 hours in stagnant air.

The interaction between the copper and the platinum phases in the copper modified noble metal-doped hydrous titanium oxide or hydrous titanium oxide/silica material produces an unexpected improvement in $NO_x$ reduction activity relative to what would be expected from the lack of any appreciable $NO_x$ reduction activity for a copper-doped hydrous titanium oxide/silica material. While the form that the copper promoter takes in the catalyst of the invention is not completely understood, there is believed to be a surface enrichment of copper on the platinum particles of the calcined catalyst. Because of the calcination conditions it is believed that at least some of the copper is present as copper (II) oxide, but it is also possible that the copper is a mixture of copper oxides ($CuO_x$) or takes another form. Regardless of the particular form taken by the copper, the association of the copper with the platinum is important to the copper promotion of the $NO_x$ reduction activity of the noble metal-doped hydrous titanium oxide catalyst. While not wishing to be bound by theory, it is believed that the synergism of the copper and the noble metal results from an enhanced concentration of the copper phase with the surface of the platinum particles. Accordingly, it is believed that the copper addition should be made after the platinum particles have been formed by calcination of the platinum-doped catalyst precursor. It is also believed that the hydrous titanium oxide should first be calcined to its crystalline titania form before the copper doping step. The effect of copper appears to be unique, as similar catalyst promotion was not observed for other metal phases (e.g., for nickel-, cobalt-, and iron-modified platinum-doped hydrous titanium oxide catalysts).

As described above, the activated noble metal-doped hydrous metal oxide material may be prepared in a coated form by either the powder slurry method or the direct coating method onto a substrate. One preferred substrate is a honeycomb monolith. The honeycomb monolith is preferably a ceramic honeycomb monolith of the type widely used for automotive catalytic converters. These monoliths are well-known in the art. Such monoliths are extruded from synthetic cordierite materials (ideally $Mg_2Al_4Si_5O_{18}$) according to well-known ceramic processes. Honeycomb cordierite monoliths are commercially available from Corning, Inc., Corning, N.Y.; and from NGK-Locke, Inc.

The resulting cordierite monolith is a macroporous support for the catalysts that has sufficient channels to both permit the exhaust stream to pass at a rate sufficient to avoid an excessive amount of back pressure that would interfere with proper operation of the engine, and also provide an effective surface area to maximize exposure of the exhaust gases to the $NO_x$ reduction catalyst.

In a particularly preferred embodiment for the direct coating method, the cordierite honeycomb monolith is first coated with a layer of γ-alumina. Monoliths with γ-alumina coatings are manufactured commercially for the automotive industry by various companies, such as ASEC Manufacturing, Tulsa, Okla.; Englehard Corp., Jackson, Miss.; Johnson Matthey, Wayne, Pa.; and Degussa Corp., Dublin, Ohio.

The effective amount of the activated noble metal-doped hydrous metal oxide depends upon the particular application, i.e., the engine operating conditions and the geometry of the coated substrate, and can be optimized by straightforward testing of loading level versus % nitrogen oxide reduction.

Preferably, the device of the invention comprises a cordierite honeycomb monolith precoated with a layer of γ-alumina and then coated with an effective amount of an activated hydrous metal oxide material doped with a member of the group consisting of platinum, palladium, and mixtures thereof; wherein the metal oxide is selected from the group consisting of zirconium oxide, titanium oxide, niobium oxide, tantalum oxide, and mixtures thereof. The γ-alumina layer is thought to maximize the surface to which the high-surface area doped hydrous metal oxide material can adhere.

The device of the invention, which comprises the substrate coated according to the methods described above, is placed in an exhaust stream of a combustion process. The device catalyzes the conversion of the emissions from the combustion process. In particular, the device reduces the $NO_x$ and oxidizes the hydrocarbons and carbon monoxide in the exhaust stream, even under oxidizing conditions. The device is particularly useful in an automotive exhaust system. With reference now to FIG. 1, an automotive exhaust system according to the invention comprises an engine 1 and a exhaust pipe 2 through which the exhaust stream containing the emissions passes to the device of the invention 3. Conversion of the emissions takes place in the device 3. The exhaust stream then passes through the exhaust pipe 4 and is emitted to the atmosphere. The device of the invention would replace a catalytic converter having the conventional three-way catalyst system in known automotive exhaust systems.

Because of the low light-off temperatures and the low temperatures that may be attained for effective operation of the device, the device may be placed as close to the end of the exhaust system as practical.

The invention is further described in the following examples. The examples are merely illustrative and do not in any way limit the scope of the invention asdescribed and claimed.

PREPARATION 1

Preparation of Sodium-Doped Hydrous Titanium Oxide/Silica Material

One mole (284.3 grams) of titanium isopropoxide and 0.2 mole (41.7 grams) of tetraethylorthosilicate were mixed well in a Teflon beaker. A separate Teflon beaker was charged with 200 grams of a 10% by weight solution of sodium hydroxide in methanol (20 grams, 0.5 mole sodium hydroxide). The mixture of titanium isopropoxide and tetraethylorthosilicate was added to the methanolic NaOH slowly (to prevent boiling) with gentle stirring. The resulting solution of the intermediate was warm and clear. The intermediate was then hydrolyzed by pouring the methanol-intermediate solution slowly, with stirring, into a large Teflon beaker containing 1000 ml acetone and 100 ml deionized water. The slurry of the hydrolyzed material was stirred for approximately two minutes, then poured into a coarse porosity glass frit Buchner funnel and allowed to settle for a few minutes. Vacuum was applied to filter the slurry. The filter cake of product was rinsed with about 500 ml of acetone, divided into three portions. The product was dried under vacuum (about 3–5 in. Hg absolute pressure) overnight. The powder was passed through a #60 sieve, grinding larger pieces as necessary.

PREPARATION 2
Preparation of Sodium-Doped Hydrous Zirconium Oxide/Silica Material One mole (327.6 grams) of zirconium n-propoxide and 0.2 mole (41.7 grams) of tetraethylorthosilicate were mixed well in a glass beaker. This mixture was added to ethanol to form zirconium ethoxide (2:1 molar ratio of ethanol to propoxide ligands). The resulting solution was briefly boiled (10 minutes). A separate Teflon beaker was charged with 200 grams of a 10% by weight solution of sodium hydroxide in methanol (20 grams, 0.5 mole sodium hydroxide). The mixture of zirconium ethoxide and tetraethylorthosilicate was added to the methanolic NaOH slowly (to prevent boiling) with gentle stirring. The resulting solution of the intermediate was warm and clear.

The intermediate was then hydrolyzed by pouring the methanol-intermediate solution slowly, with stirring, into a large Teflon beaker containing 2000 ml acetone and 100 ml deionized water. The slurry of the hydrolyzed material was stirred for approximately two minutes, then poured into a coarse porosity glass frit Buchner funnel and allowed to settle for a few minutes. Vacuum was applied to filter the slurry. The filter cake of product was rinsed with about 500 ml of acetone, divided into three portions. The product was dried under vacuum (about 3–5 in. Hg absolute pressure) overnight. The powder was passed through a #60 sieve, grinding larger pieces as necessary.

METHOD OF EVALUATION I (FOR EXAMPLES 1–7)

Dynamic Sweep Down Test for Bulk Powder Samples

The materials prepared in the following Examples 1–6 were evaluated for $NO_x$ conversion capabilities according to the following method.

Nominally 1 gram of the product material was heated to about 500° C. under nitrogen. A reactant gas containing 8% oxygen, 7% carbon dioxide, 7% water, 400 parts per million (ppm) by volume carbon monoxide, 133 ppm by volume hydrogen, 467 ppm by volume propylene, 233 ppm by volume propane, and 250 ppm by volume nitrogen oxide was introduced at a rate of 20 liters gas per hour per cubic centimeter of product material. A scan was conducted from 500 to 125° C. at a rate of 5° C./minute or less to produce a %$NO_x$ (or other species) conversion curve.

EXAMPLE 1

Preparation of Activated High-Sodium Platinum-Doped Hydrous Titanium Oxide/Silica Material by Cation Exchange A solution of 0.14 grams of $Pt(NH_3)_4(NO_3)_2$ in 100 ml of deionized water was prepared. To this solution was added 10.0 grams of the sodium-doped hydrous titanium oxide/silica material of Preparation 1. The pH was adjusted to about 5.5 with 10 wt. % nitric acid and maintained at pH 5.5 for 10 minutes by dropwise addition of the nitric acid, as necessary. The slurry was filtered using a coarse porosity glass frit Buchner funnel. The collected solid material was rinsed with three 25-ml portions of deionized water, then rinsed with three 25-ml portions of acetone. The filter cake was broken up and vacuum pulled on the powder in the Buchner funnel for about an hour to dry the powder. The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./min. and calcined at that temperature for two hours in stagnant air.

Figure 2:
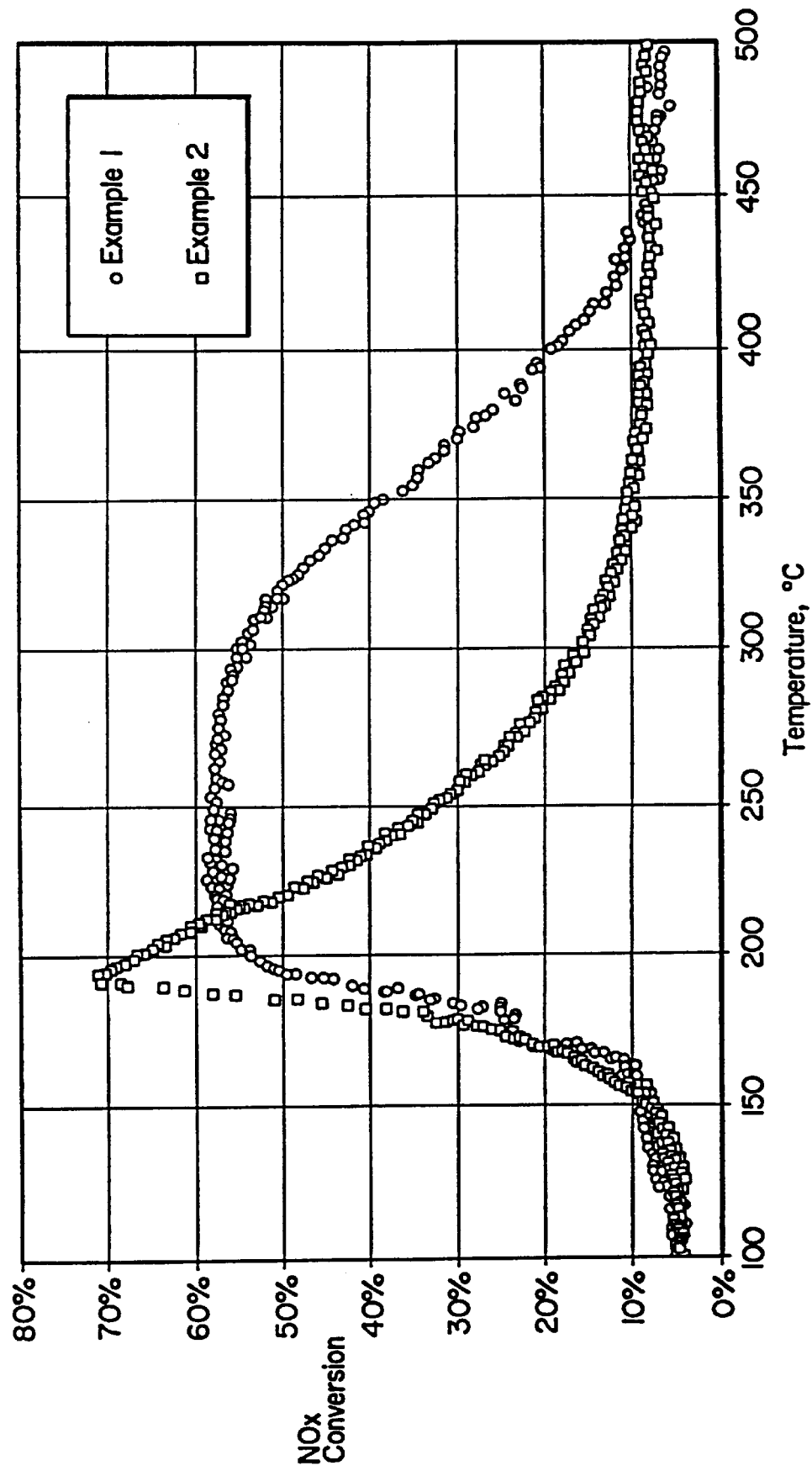
FIGS. 2–10 illustrate $NO_x$ conversion test results for the devices of Examples 1–14.

The prepared product was determined by atomic absorption spectrometry to be 0.94% platinum and 3.32% sodium by weight. The $NO_x$ conversion curve is shown in FIG. 2. The maximum $NO_x$ conversion was 58%, and the conversion window was about 200° C. to about 300° C.

EXAMPLE 2

Preparation of Low-Sodium Platinum-Doped Hydrous Titanium Oxide/Silica Material by Cation Exchange A solution of 0.14 grams of $Pt(NH_3)_4(NO_3)_2$ in 100 ml of deionized water was prepared. To this solution was added 10.0 grams of the sodium-doped hydrous titanium oxide/silica material of Preparation 1. The pH was adjusted to about 5.5 with 10 wt. % nitric acid and maintained at pH 5.5 for 10 minutes by dropwise addition of the nitric acid, as necessary. The slurry was filtered using a coarse porosity glass frit Buchner funnel. The collected solid material was rinsed with three 25-ml portions of deionized water, then rinsed with three 25-ml portions of acetone. The filter cake was broken up and vacuum pulled on the powder in the Buchner funnel for about an hour to dry the powder.

The high-sodium powder obtained at this point was acidified by slurrying the powder in 100 ml deionized water, adjusting the pH to 4.0 with 10 wt. % nitric acid, and maintaining the slurry at pH 4.0 for 1 minute with dropwise addition of acid as needed. The slurry was filtered using a Buchner funnel and rinsed with three 25-ml portions of deionized water. The acidification step was repeated twice more. After the slurry was filtered for the third time and rinsed with the three 25-ml portions of deionized water, the solid product was rinsed with three 25-ml portions of acetone.

The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./min and calcined at that temperature for two hours in stagnant air.

The prepared product was determined by atomic absorption spectrometry to be 0.97% Pt and 0.48% Na, by weight. The $NO_x$ conversion curve is shown in FIG. 2. The maximum $NO_x$ conversion was 71% at a temperature of 192° C.

EXAMPLE 3

Preparation of Activated Low-Sodium Platinum-Doped Hydrous Titanium Oxide/Silica Material by Anion Exchange A portion of 10 grams of the sodium-doped hydrous titanium oxide/silica material of Preparation 1 was slurried in 100 ml of water. This slurry was acidified to pH 2.5 by the addition of 10 wt. % HCl. The slurry was filtered with a coarse porosity, glass frit Buchner funnel. The solid collected was rinsed with three 25-ml portions of deionized water. The filter cake was dispersed again in 100 ml of deionized water and the pH measured. The slurry was acidified to pH 2.5 with 10 wt. % HCl. This step of filtering, rinsing, redispersing, and acidifying was repeated until the initial pH of the slurry was 2.7 or less.

An amount of 0.6 gram $H_2PtCl_6$ was added to the slurry and the slurry was then mixed for 30 min. using a magnetic stir bar and stir plate. The slurry was filtered with a coarse porosity, glass frit Buchner funnel. The solid collected was rinsed with three 25-ml portions of deionized water, and then rinsed with three 25-ml portions of acetone. The final filtrate was removed from the flask and vacuum (about 3–5 in. Hg) was pulled on the powder in the Buchner funnel for about one hour, using a stir rod to break up the filter cake into a free-flowing powder.

Figure 3:
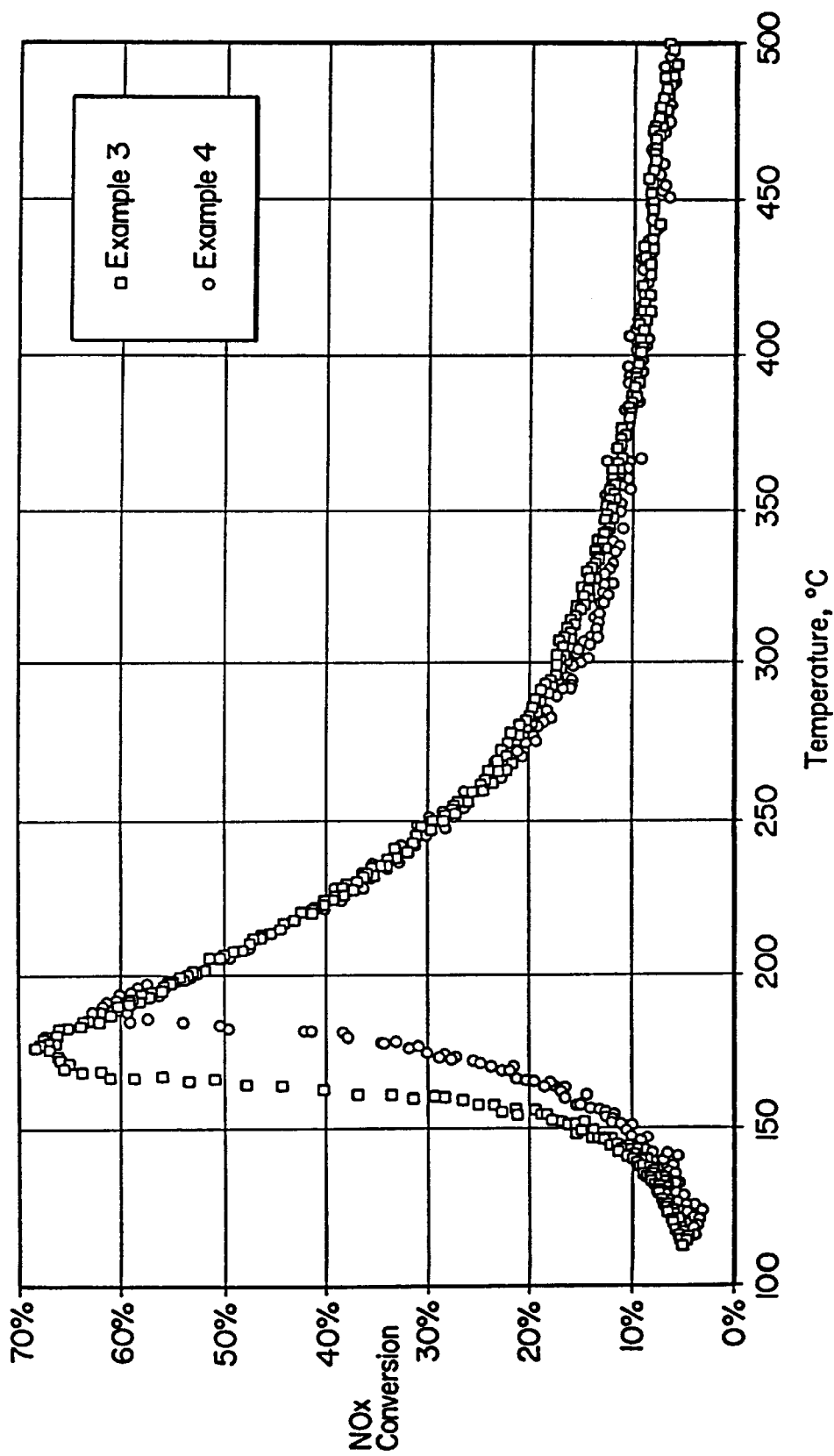

The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./min. and calcined at that temperature for two hours in stagnant air. The prepared product was determined by atomic absorption spectrometry to be 0.95% Pt and 0.01% Na, by weight. The $NO_x$ conversion curve is shown in FIG. 3. The maximum $NO_x$ conversion was 68% at a temperature of 176° C.

EXAMPLE 4

Preparation of Activated Low-Sodium Platinum-Doped Hydrous Zirconium Oxide/Silica Material by Anion Exchange The procedure of Example 3 was followed, substituting 10 grams of the sodium-doped hydrous zirconium oxide/silica material of Preparation 2 for the sodium-doped hydrous titanium oxide/silica material of Preparation 1.

The prepared product was determined by atomic absorption spectrometry to be 0.97% Pt and 0.01% Na, by weight. The $NO_x$ conversion curve is shown in FIG. 3. The maximum $NO_x$ conversion was 62% at a temperature of 187° C.

EXAMPLE 5

Preparation of Activated Low-Sodium Platinum-Doped Hydrous Zirconium Oxide/Silica Material by Cation Exchange A portion of 10 grams of the sodium-doped hydrous zirconium oxide/silica material of Preparation 2 was slurried in 50 ml of deionized water. The slurry was acidified to and stabilized at pH 8 with the addition of 10 wt. % $HNO_3$. In a separate container, 0.16 gram $Pt(NH_3)_4(NO_3)_2$ was dissolved in 50 ml deionized water. The platinum solution was added to the acidified slurry and mixed for 30 minutes using a magnetic stir bar and stir plate. The slurry was filtered using a coarse porosity glass frit Buchner funnel. The solid product was rinsed with three 25-ml portions of deionized water. The filter cake was redispersed in 100 ml deionized water. The redispersed slurry was acidified to pH 4 with 10 wt. % nitric acid and stirred for 1–2 minutes. The acidified slurry was filtered with a coarse porosity glass frit Buchner funnel. The filter cake was rinsed, first with three 25-ml portions of deionized water and then with three 25-ml portions of acetone. The final filtrate was removed from the flask and vacuum (about 3–5 in. Hg) was pulled on the powder in the Buchner funnel for about one hour, using a stir rod to break up the filter cake into a free-flowing powder.

The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./min. and calcined at that temperature for two hours in stagnant air.

Figure 4:
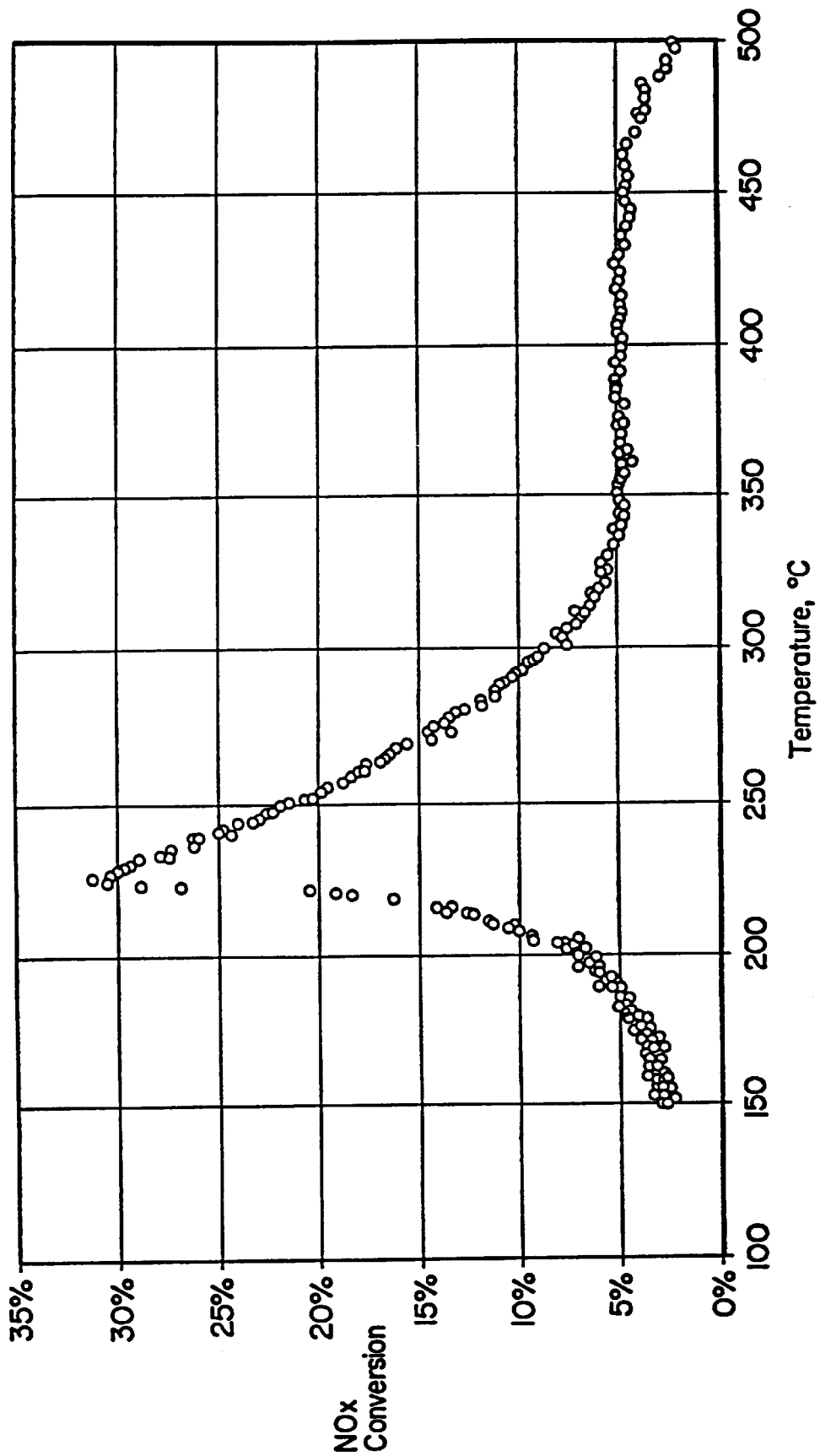

The prepared product was determined by atomic absorption spectrometry to be 0.77% Pt and 0.11% Na, by weight. The $NO_x$ conversion curve is shown in FIG. 4. The maximum $NO_x$ conversion was 31% at a temperature of 227° C.

EXAMPLE 6

Preparation of Activated Low-Sodium Platinum- and Palladium-Doped Hydrous Titanium Oxide/Silica Material by Co-Cation Exchange A 10 wt. % solution of $Pd(NH_3)_4(NO_3)_2$ was made in deionized water. In a suitable container, 0.115 gram $Pt(NH_3)_4(NO_3)_2$ and 0.59 gram of the $Pd(NH_3)_4(NO_3)_2$ solution were dissolved in 100 ml deionized water. Next, 10 grams of the sodium-doped hydrous titanium oxide/silica material of Preparation 1 were added. The slurry was acidified to pH 5.5 with 10 wt. % nitric acid, holding the slurry at pH 5.5 for ten minutes by adding the 10 wt. % nitric acid dropwise as needed. The slurry was filtered using a coarse porosity glass frit Buchner funnel. The solid product was rinsed with three 25-ml portions of deionized water. The filter cake was redispersed in 100 ml deionized water. The redispersed slurry was acidified to pH 4.0 and held at pH 4.0 for one minute with additions of 10 wt. % nitric acid. The acidified slurry was filtered with a coarse porosity glass frit Buchner funnel and rinsed with three 25-ml portions of deionized water. The dispersion and acidification step was repeated twice more. After the final acidification and water rinse, the product was rinsed with three 25-ml portions of acetone. The final filtrate was removed from the flask and vacuum (about 3–5 in. Hg) was pulled on the powder in the Buchner funnel for about one hour, using a stir rod to break up the filter cake into a free-flowing powder.

The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./min. and calcined at that temperature for two hours in stagnant air.

Figure 5:
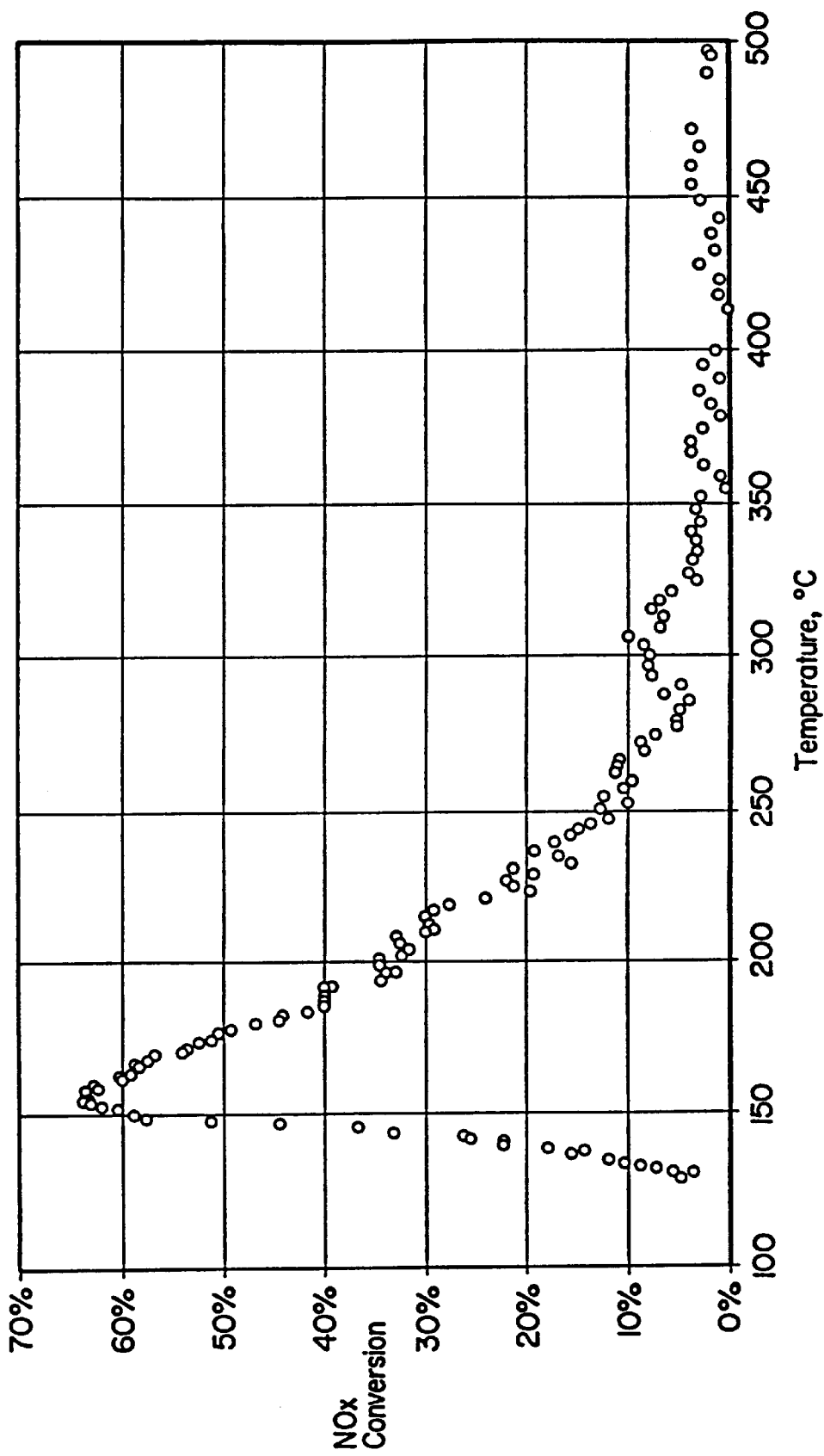

The prepared product was determined by atomic absorption spectrometry to be 0.82% Pt, 0.31% Pd, and 0.64% Na, by weight. The $NO_x$ conversion curve is shown in FIG. 5. The maximum $NO_x$ conversion was 64% at a temperature of 158° C.

EXAMPLE 7

Preparation of Activated Platinum-Doped Hydrous Titanium Oxide/Silica Material With High Platinum Loading for Use in the Powder Slurry Method Bulk catalyst powders used in the powder slurry coating method typically contain a higher concentration of platinum to account for the dilution effect of the binders and other additives used for slurry preparation so that the desired final concentration of platinum which is based upon the weight of the coated substrate will be obtained. In this example, bulk activated platinum-doped hydrous titanium oxide/silica catalyst powder with a high Pt loading was prepared.

A solution of 6.16 g Pt(NH$_3$)$_4$(NO$_3$)$_2$ was dissolved in 500 ml deionized water. To this solution was added 50.0 grams of the sodium-doped hydrous titanium oxide/silica material of Preparation 1. The pH was adjusted to 5.5 with 10 wt. % nitric acid and maintained at pH 5.5 for 10 minutes by dropwise addition of the nitric acid, as necessary. The slurry was filtered using a coarse porosity glass frit Buchner funnel. The collected solid material was rinsed with three 125-ml portions of deionized water. The high sodium powder obtained at this point was acidified by slurrying the powder in 150 ml deionized water, adjusting the pH to 4.0 with 10 wt. % nitric acid, and maintaining the pH at 4.0 for 1 minute with dropwise addition of acid as needed. The slurry was filtered using a Buchner funnel and rinsed with three 125-ml portions of deionized water. The acidification step was repeated twice more. After the slurry was filtered for the third time and rinsed with three 125-ml portions of deionized water, the solid product was rinsed with three 125 ml portions of acetone.

Figure 6:
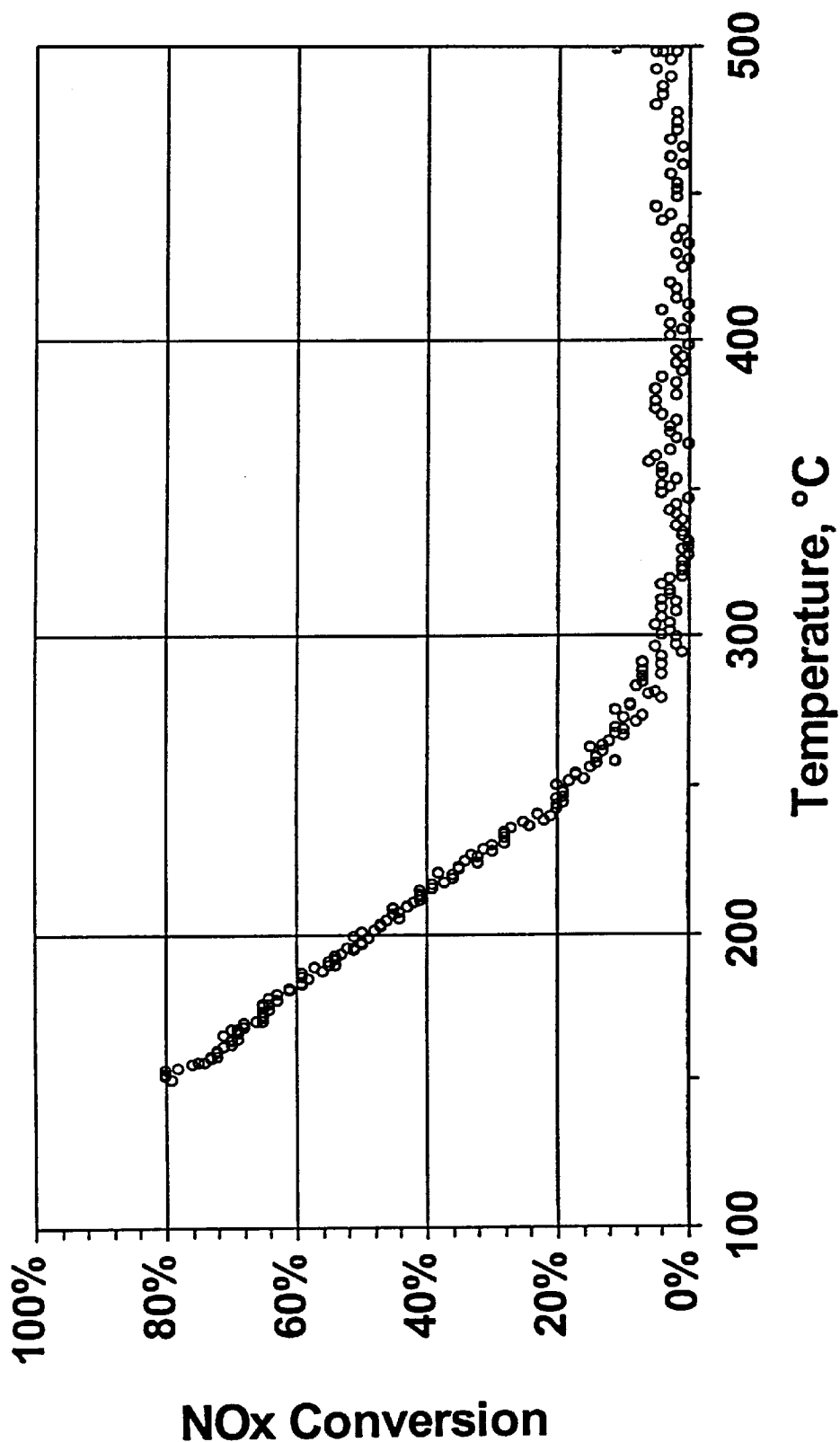

A small portion of this as-prepared material was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./minute and calcined at that temperature for two hours in stagnant air. The prepared material contained 6.3 wt. % Pt and had a maximum NO$_x$ conversion of 78.9% at a temperature of 150° C. The full NO$_x$ conversion profile for this sample is illustrated in FIG. 6.

METHOD OF EVALUATION II (FOR EXAMPLES 8 and 9)

Isothermal Test for Bulk Powder Samples

The materials prepared in the following Examples 8 and 9 were evaluated for NO$_x$ conversion capabilities according to the following method.

Nominally 1 gram of the product material was heated to 150° C. in a full reactant gas mix with the exception of water. The full reactant gas mix contained 8% oxygen, 7% carbon dioxide, 7% water, 400 parts per million (ppm) by volume carbon monoxide, 133 ppm by volume hydrogen, 467 ppm by volume propylene, 233 ppm by volume propane, and 250 ppm by volume nitrogen oxide. Once the reactor temperature was stable at 150° C., the water was added to the reactant gas mix and the total gas flow rate was set to 20 liters gas per hour per cubic centimeter of product material. After a 60-minute hold period at 150° C., the temperature was increased to the next desired set point. A total of 8 to 15 temperature set points were used, typically spaced 10 to 50° C. apart, with hold times at each temperature of 20 to 45 minutes. Propylene, propane, carbon monoxide, and nitrogen oxide concentrations were monitored continuously as a function of time. A plot of the % conversion as a function of temperature was then used to produce the steady state % NO$_x$ (or other species) conversion profile.

EXAMPLE 8

Preparation of Bulk Activated Copper Modified Platinum-Doped Hydrous Titanium Oxide/Silica Material by Cation Exchange/Impregnation Techniques Approximately 2.0 grams of the granules of a calcined low-sodium platinum-doped hydrous titanium oxide silica material prepared according to Example 2 were placed in a small Pyrex crystallizing dish. Separately, approximately 0.06 grams of Cu(NO$_3$)$_2$.2.5 H$_2$O was dissolved in 1.75 ml of deionized water. The aqueous copper nitrate solution was added to the crystallizing dish and the contents of the dish were mixed very gently to uniformly coat the platinum-doped hydrous titanium oxide/silica granules. The coated granules were dried, first at room temperature for about 4 hours, then at 100° C. in air, and finally heated at 5° C./minute up to 600° C. and calcined at that temperature for two hours in stagnant air.

Figure 7:
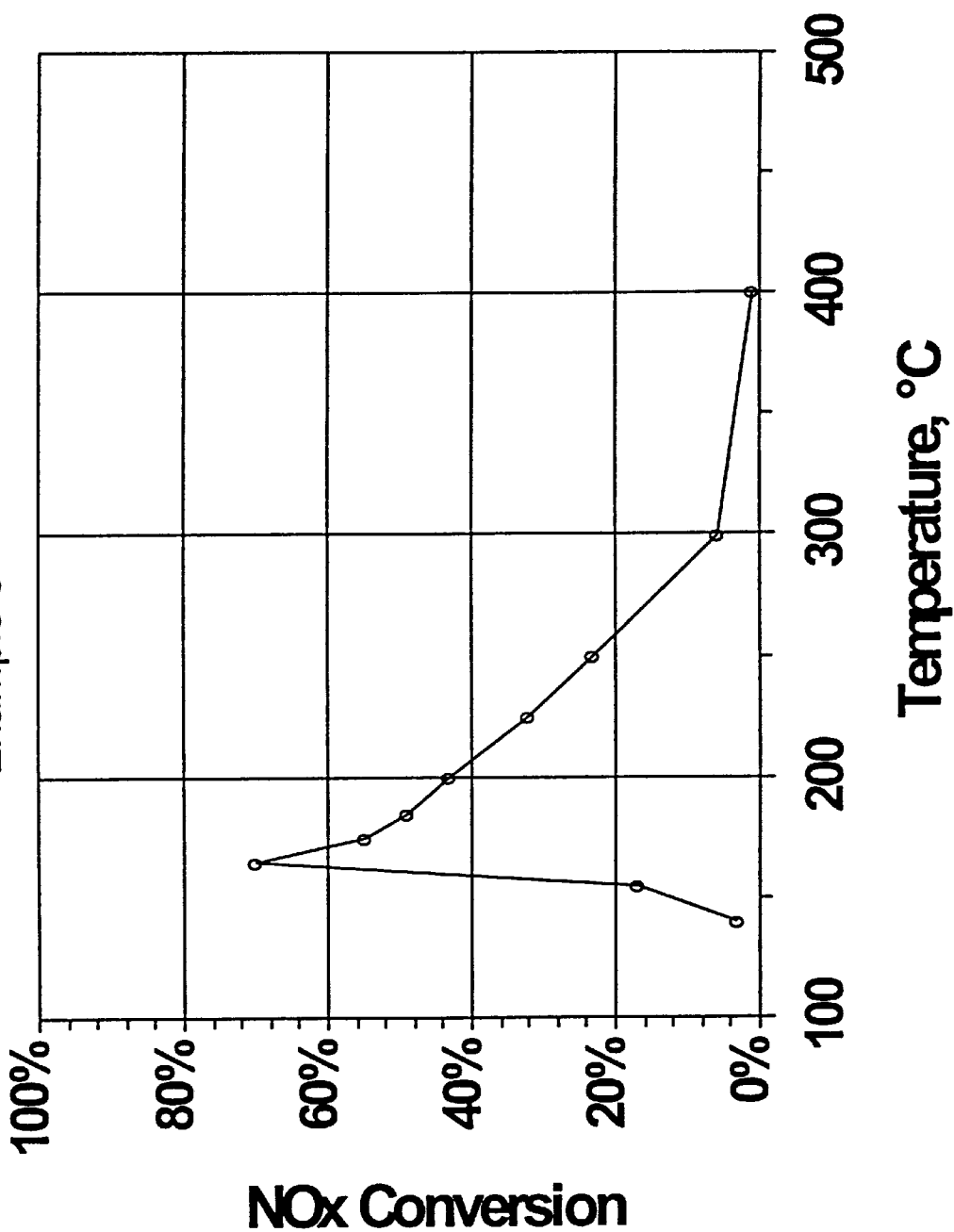

The prepared product was determined by atomic absorption spectrometry to be 1.07% by weight Pt and 1.0% by weight copper, measured as theoretical CuO. The NO$_x$ conversion curve is shown in FIG. 7. The maximum NO$_x$ conversion was 70.1% at a temperature of 165° C.

EXAMPLE 9

Preparation of Activated Copper Modified Platinum-Doped Hydrous Titanium Oxide/Silica Material With High Platinum Loading for Use in the Powder Slurry Method Bulk catalyst powders used in the slurry coating method typically contain a higher concentration of Pt to account for the dilution effect of the binders and other additives used for slurry preparation to obtain the desired platinum concentration based on weight of the coated substrate. In this example, a bulk activated copper modified platinum-doped hydrous titanium oxide/silica catalyst powder was prepared using a procedure combining the techniques described in Examples 7 and 8.

A solution of 0.51 g Pt(NH$_3$)$_4$(NO$_3$)$_2$ was dissolved in 100 ml deionized water. To this solution was added 10.0 grams of the sodium-doped hydrous titanium oxide/silica material of Preparation 1. The pH was adjusted to 5.5 with 10 wt. % nitric acid and maintained at pH 5.5 for 10 minutes by dropwise addition of the nitric acid, as necessary. The slurry was filtered using a coarse porosity glass frit Buchner funnel. The collected solid material was rinsed with three 25-ml portions of deionized water. The high sodium powder obtained at this point was acidified by slurrying the powder in 150 ml deionized water, adjusting the pH to 4.0 with 10 wt. % nitric acid, and maintaining the pH at 4.0 for 2 minutes with dropwise addition of acid as needed. The slurry was filtered using a Buchner funnel and rinsed with three 25-ml portions of deionized water. The acidification step was repeated twice more. After the slurry was filtered for the third time and rinsed with three 25-ml portions of deionized water, the solid product was rinsed with three 25-ml portions of acetone.

The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./minute and calcined at that temperature for two hours in stagnant air.

Figure 8:
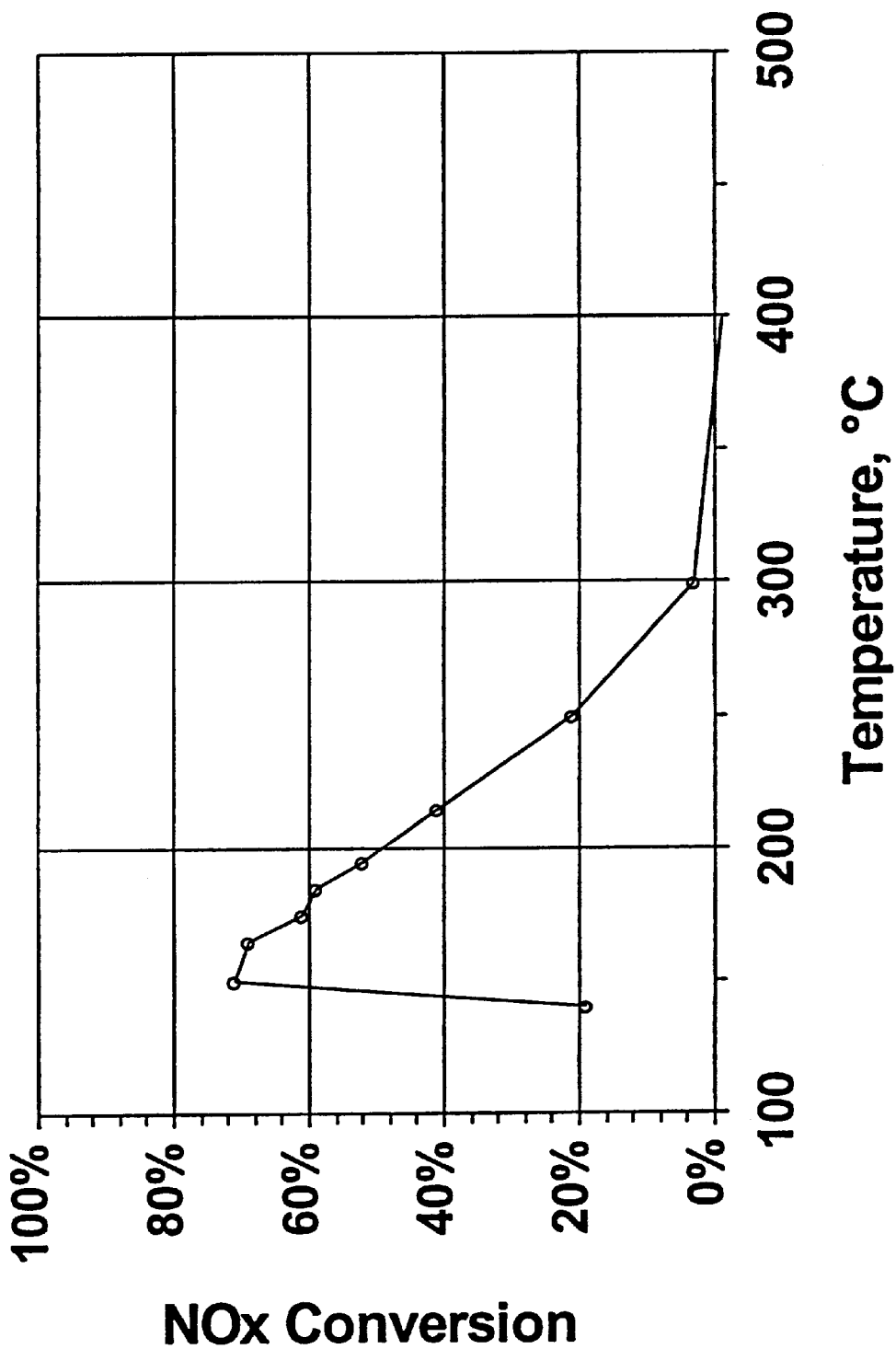

Next, the copper promoter was added to the calcined platinum catalyst. Approximately 1.5 g of the calcined (activated) platinum-doped hydrous titanium oxide/silica granules (−60/+80 mesh) were placed in a small Pyrex crystallizing dish. Approximately 0.05 grams of Cu(NO$_3$)$_2$.2.5 H$_2$O were dissolved in 1.4 ml of deionized H$_2$O. The aqueous Cu(NO$_3$)$_2$ solution was added to the activated platinum-doped hydrous titanium oxide/silica granules and mixed very gently to ensure a uniformly coating. The mixture was dried at room temperature for about 4 hours in air, then dried at 100° C. in air, and finally calcined at 600° C. for 2 hours in stagnant air (heating rate=5° C./min). The material resulting from this preparation contained 3.9 wt. % Pt and 1.0 wt. % copper, measured as theoretical CuO, and had a maximum $NO_x$ conversion of 71.0% at a temperature of 150° C. The full $NO_x$ conversion profile for this sample is illustrated in FIG. 8.

PREPARATION 3

Preparation of Sodium-Doped Hydrous Titanium Oxide/Silica Coating on a Cordierite Monolith Precoated with γ-Alumina by the Direct Coating Method A mixture of 4.2 grams of tetraethylorthosilicate and 28.4 grams titanium isopropoxide was added slowly to a solution of 2 grams NaOH in 20.3 grams methanol. The resulting clear intermediate sol was put into a Teflon bottle with three small cordierite monoliths precoated with γ-alumina.

Each monolith was approximately 1.3 cm in diameter by 1.0 cm in length and weighed about 0.65–0.8 gram. The monoliths were allowed to sit overnight in the coating solution. The three monoliths were then removed from the solution and placed on a Buchner funnel. After pulling a vacuum on the flask for about 5 seconds to remove the excess soluble intermediate solution, the monoliths were transferred to a dessicator and dried at room temperature under vacuum. The sodium-doped hydrous titanium oxide/silica material coating was determined to be about 10 wt. % with respect to the overall monolith weight.

METHOD OF EVALUATION III (FOR EXAMPLES 10–14)

Isothermal Test for Monolith Core Samples

The materials prepared in the following Examples 10–14 were evaluated for NOx conversion capabilities according to the following method.

A nominally 1 cm long by 1.3 cm diameter cylindrical sample was heated to 150° C. in a full reactant gas mix with the exception of water. The full reactant gas mix contained 8% oxygen, 7% carbon dioxide, 7% water, 400 parts per million (ppm) by volume carbon monoxide, 133 ppm by volume hydrogen, 467 ppm by volume propylene, 233 ppm by volume propane, and 250 ppm by volume nitrogen oxide. Once the reactor temperature was stable at 150° C., the water was added to the reactant gas mix and the total gas flow rate was set to 50 liters gas per hour per cubic centimeter of product material. After a 60-minute hold period at 150° C., the temperature was increased to the next desired set point. A total of 8 to 15 temperature set points were used, typically spaced 10 to 50° C. apart, with hold times at each temperature of 20 to 45 minutes. Propylene, propane, carbon monoxide, and nitrogen oxide concentrations were monitored continuously as a function of time. A plot of the % conversion as a function of temperature was then used to produce the steady state % $NO_x$ (or other species) conversion profile.

EXAMPLE 10

Addition of Platinum to the Hydrous Titanium Oxide/Silica Coated γ-Alumina/Cordierite Monolith Produced by the Direct Coating Method and Activation A cordierite monolith with 1 wt. % of platinum metal based on total monolith weight was prepared by ion exchange with a 33% excess of platinum with respect to the nominal target composition. An approximately 0.85 gram monolith, prepared according to Preparation 3, was suspended in a solution of 0.023 gram $Pt(NH_3)_4(NO_3)_2$ in 50 ml deionized water. The solution was stirred gently and the pH lowered to 5.5 using 0.1N nitric acid, The solution was held at pH 5.5 for 30 minutes by adding 0.01N nitric acid dropwise as needed. The solution was decanted off and the monolith placed in a Buchner funnel.

After pulling a vacuum on the flask for about 2 seconds, the monolith was rinsed with three 25-ml portions of deionized water, and then rinsed with three 25-ml portions of acetone. The monolith was dried on the Buchner funnel at room temperature under vacuum for about one hour. The monolith was heated at 5° C./minute up to 600° C. and then calcined at that temperature for two hours in stagnant air.

Figure 9:
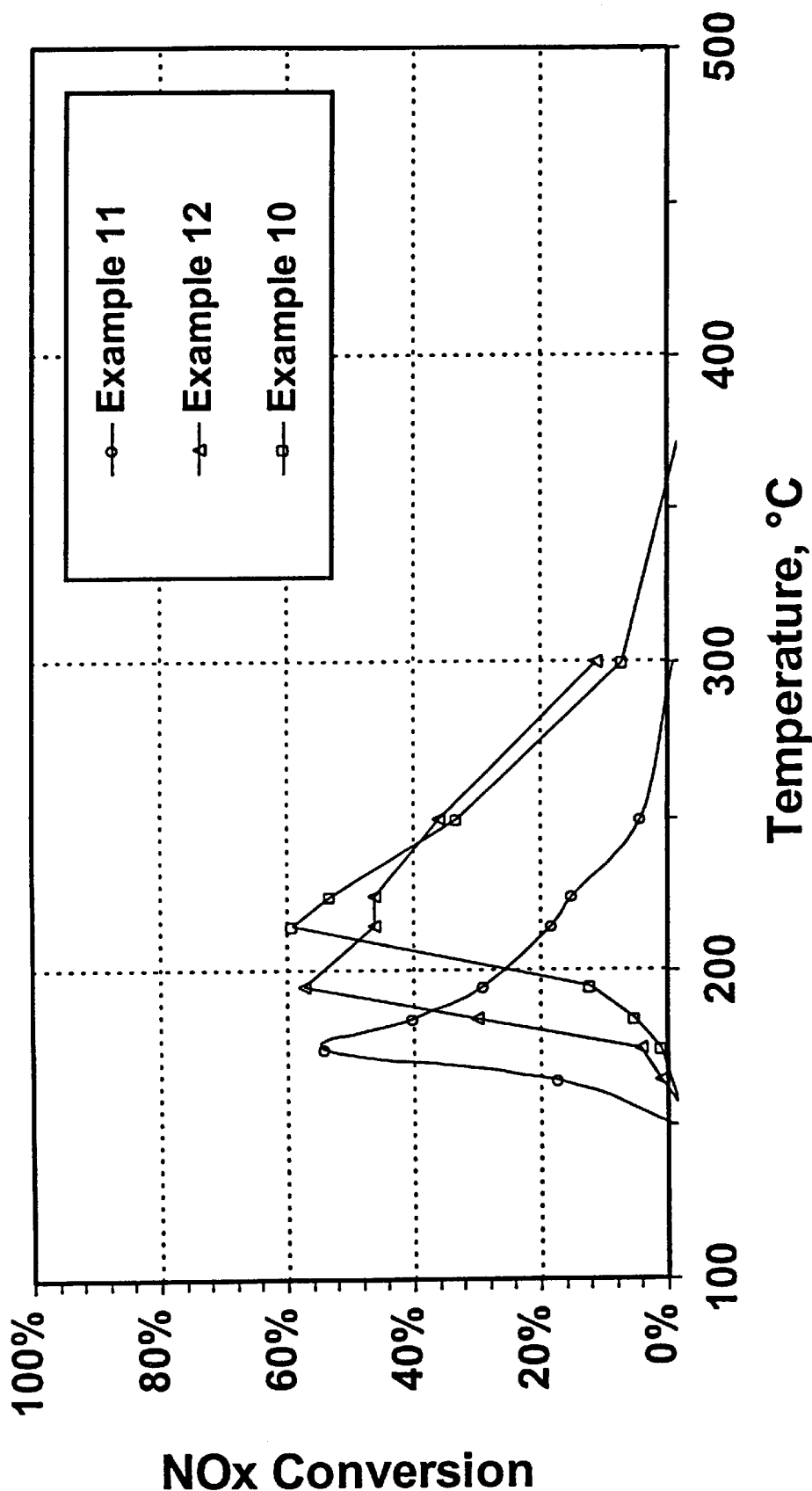

The prepared monolith product was determined by atomic absorption spectrometry to have 0.99% Pt and 0.16% Na, by weight, The $NO_x$ reduction curve is shown in FIG. 9. The maximum $NO_x$ conversion was 59.0% at a temperature of 215° C.

EXAMPLE 11

Addition of Platinum and Palladium to the Hydrous Titanium Oxide/Silica Coated γ-Alumina/Cordierite Monolith Produced by the Direct Coating Method and Activation A cordierite with 1 wt. % of platinum and 0.1 wt. % of palladium based on total monolith weight was prepared by ion exchange using a 33% excess of platinum and palladium with respect to the nominal target composition. The excess of the catalyst metals was used because of the less efficient cation exchange with hydrous metal oxide coatings on cordierite substrate, as compared to ion exchange of the hydrous metal oxide by itself.

An approximately 0.84 gram monolith, prepared according to Preparation 3, was suspended in a solution of 0.023 gram $Pt(NH_3)_4(NO_3)_2$ in 50 ml deionized water to which was added 0.032 gram of a 10 wt. % solution of $Pd(NH_3)_4(NO_3)_2$ in deionized water. The solution was stirred gently and the pH lowered to 5.5 using 0.1N nitric acid. The solution was held at pH 5.5 for 30 min. by adding 0.01N nitric acid dropwise as needed. The solution was decanted off and the monolith placed in a Buchner funnel. After pulling a vacuum on the flask for about 2 seconds, the monolith was rinsed with three 25-ml portions of deionized water, and then rinsed with three 25-ml portions of acetone. The monolith was dried on the Buchner funnel at room temperature under vacuum for about one hour. The monolith was then heated at 5° C./minute up to 600° C. and then calcined at that temperature for two hours in stagnant air.

The prepared monolith product was determined by atomic absorption spectrometry to have 0.82% Pt, 0.08% Pd, and 0.12% Na, by weight. The $NO_x$ reduction curve is shown in FIG. 9. The maximum $NO_x$ conversion was 53.6% at a temperature of 175° C.

EXAMPLE 12

Preparation of Copper Modified Activated Platinum-Doped Hydrous Titanium Oxide/Silica on a Cordierite Monolith Precoated with γ-Alumina Using a Direct Coating Method A γ-alumina precoated cordierite monolith having a calcined coating of platinum-doped hydrous titanium oxide/ silica was prepared according to the procedure of Example 10. The prepared monolith had about 1% by weight of platinum, based on the weight of the monolith.

Separately, 0.06 grams of $Cu(NO_3)_2 \cdot 2.5\ H_2O$ was dissolved in 5 ml of deionized water. The monolith was soaked in the copper nitrate solution for 24 hours. The monolith was then removed from the copper nitrate solution and the excess solution was removed from the monolith channels using compressed air. The monolith was dried, first at room temperature for about 4 hours and then at 100° C. in air for two hours. The dried monolith was calcined by heating at 5° C./minute up to 600° C. and holding at that temperature for two hours in stagnant air.

The prepared product was determined by atomic absorption spectrometry to be 1.16% by weight Pt and 0.58% by weight copper, measured as theoretical CuO. The NOx reduction curve is shown in FIG. 9. The maximum NOx conversion was 56.9% at a temperature of 195° C.

EXAMPLE 13

Preparation of Activated Platinum-Doped Hydrous Titanium Oxide/Silica Material on a Cordierite Monolith Using the Powder Slurry Method For aqueous slurry preparation, the final activated platinum-doped hydrous titanium oxide/silica catalyst powder from Example 7 (fine powder form) and the $\gamma$-$Al_2O_3$ are weighed out in a 3:1 ratio. Sufficient deionized water is added to produce a thick slurry (30–50 wt. % solids). To the slurry is added a small amount of ceramic media to facilitate mixing. The slurry is placed on a roller mill overnight.

The next day, following the overnight milling of the catalyst slurry, a slurry of Disperal $Al_2O_3$ (dispersible alumina gel, sold under the tradenames of PURAL® or CATAPAL® by Condea Chemie) is prepared by mixing 28 parts by weight Disperal, 66 parts by weight deionized $H_2O$, and 1 part by weight $HNO_3$. The Disperal is added slowly, with mixing, to the acid-water solution. Sufficient Disperal slurry is added to the catalyst slurry to generate a Disperal solids content in the combined slurry of 9 wt. % with respect to the total solids content of the slurry. The resulting catalyst-Disperal slurry is returned to the roller mill until needed for coating (mixed for a minimum of five minutes).

Cordierite monoliths (with or without an $Al_2O_3$ washcoat) are coated by depositing sufficient slurry on the monolith to cover all channels. The monolith may be pre-wet with deionized $H_2O$ prior to application of the first coating. Vacuum is then applied to pull the slurry through the monolith. From one to three coatings are applied to the monolith with the slurry optionally pulled through opposite ends of the monolith core on subsequent coating steps.

Figure 10:
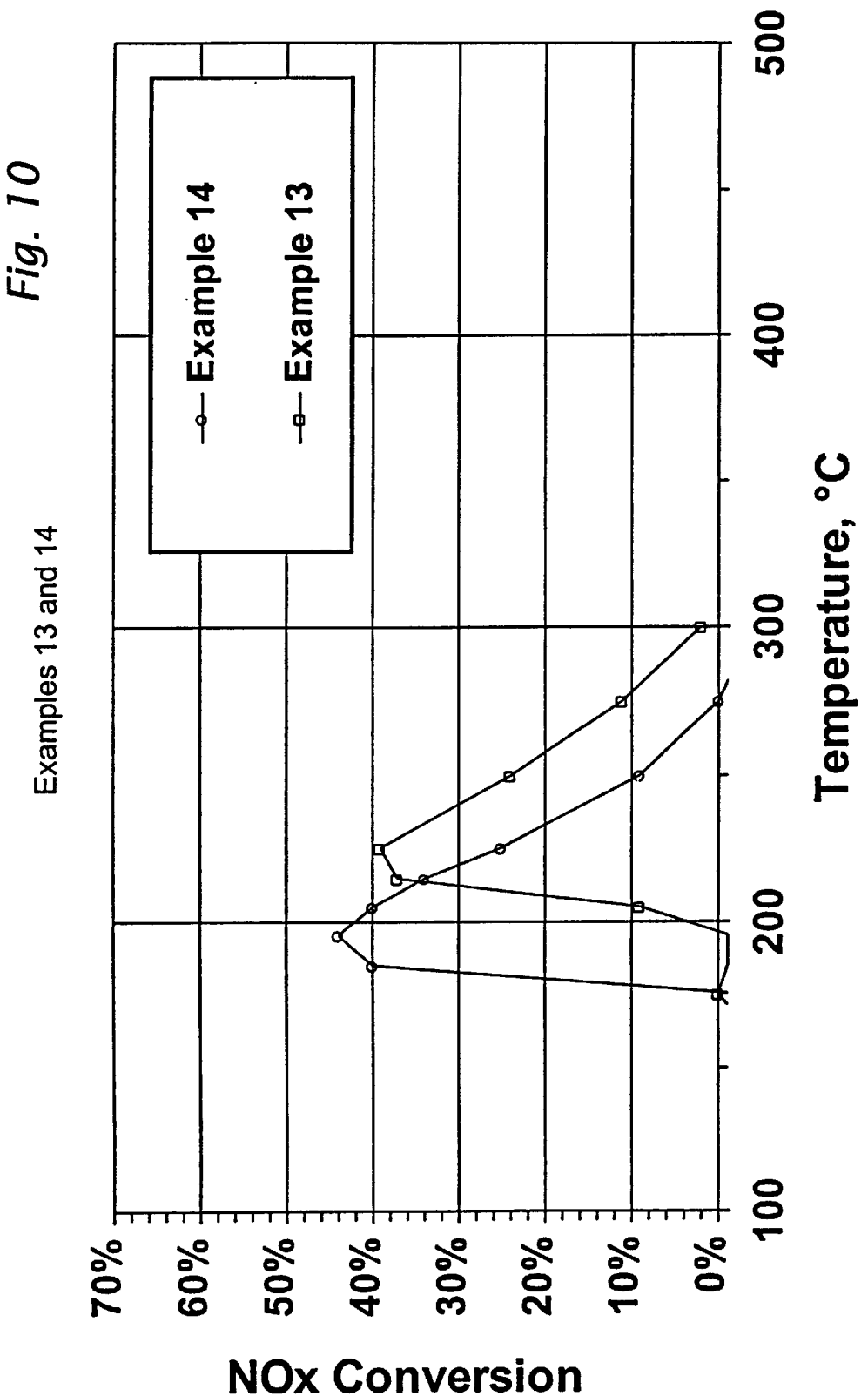

Coated monoliths are baked per the following schedule: room temperature to 100° C. at 180° C./h (1 h hold at 100° C.), 100 to 425° C. at 180° C./h (4 h hold at 425° C.). Using the specific activated platinum-doped hydrous titanium oxide/silica catalyst powder mentioned above in Example 7 (6.3 wt. % Pt), a coating procedure consisting of a single application of slurry without pre-wetting (with deionized $H_2O$) of the cordierite substrate resulted in a final loading of 0.82 wt. % Pt on an overall monolith weight basis. This catalyst sample had a maximum $NO_x$ conversion of 39.0% at a temperature of 225° C. The full $NO_x$ conversion profile for this sample is illustrated in FIG. 10.

EXAMPLE 14

Preparation of Copper Modified Activated Platinum-Doped Hydrous Titanium Oxide/Silica Material on a Cordierite Monolith Using the Powder Slurry Method The preparation of Example 9 was repeated on a larger scale to prepare approximately 10 grams of final catalyst material (in fine powder form) that contained 3.6 wt. % Pt and 1.0 wt. % copper, measured as theoretical CuO. For aqueous slurry preparation, the final activated bulk catalyst powder (fine powder form) and the $\gamma$-$Al_2O_3$ are weighed out in a 3:1 ratio. Sufficient deionized $H_2O$ is added to produce a thick slurry (30–50 wt. % solids). A small amount of ceramic media is added to the slurry to facilitate mixing. The slurry is placed on a roller mill overnight.

The next day, following the overnight milling of the catalyst slurry, a slurry of Disperal $Al_2O_3$ (dispersible alumina gel, available as PURAL® or CATAPAL® from Condea Chemie), is prepared by mixing 28 parts by weight Disperal, 66 parts by weight deionized $H_2O$, and 1 part by weight $HNO_3$. The Disperal is added slowly, with mixing, to the acid-water solution. Sufficient Disperal slurry is added to the catalyst slurry to generate a Disperal solids content in the combined slurry of 9 wt. %. The resulting catalyst-Disperal slurry is returned to the roller mill until needed for coating. (The combined slurry is mixed for a minimum of five minutes.)

Cordierite monoliths (with or without an $Al_2O_3$ washcoat) are coated by depositing sufficient slurry on the monolith to cover all channels. The monolith may be pre-wet with deionized $H_2O$ prior to application of the first coating. Vacuum is then applied to pull the slurry through the monolith. From one to three coatings are applied to the monolith with the slurry optionally pulled through opposite ends of the monolith core on subsequent coating steps.

The coated monoliths are baked per the following schedule: room temperature to 100° C. at 180° C./h (1 h hold at 100° C.), 100 to 425° C. at 180° C./h (4 h hold at 425° C.). Using the specific copper modified platinum-doped hydrous titanium oxide/silicate powder mentioned above (3.6 wt. % Pt and 1.0 wt. % copper as theoretical CuO, a coating procedure consisting of a single application of slurry without pre-wetting (with deionized $H_2O$) of the cordierite substrate resulted in a final loading of 0.84 wt. % Pt and 0.23 wt. % CuO on an overall monolith weight basis. This catalyst sample had a maximum $NO_x$ conversion of 43.8% at a temperature of 195° C. The full NOx conversion profile for this sample is illustrated in FIG. 10.

COMPARATIVE EXAMPLE A

Preparation of Activated Copper-Doped Hydrous Titanium Oxide/Silica Material 2.54 grams of $Cu(NO_3)_2 \cdot 2.5\ H_2O$ was dissolved in 300 ml deionized water. 30 grams sodium doped hydrous titanium oxide/silica material from Preparation 1 was added to the $Cu(NO_3)_2$ solution. The pH was adjusted to 5.5 with 10 wt. % nitric acid and maintained at pH 5.5 for 10 minutes by dropwise addition of the nitric acid, as necessary. The slurry was filtered using a coarse porosity glass frit Buchner funnel. The collected solid material was rinsed with three 75-ml portions of deionized water. The high-sodium powder obtained at this point was acidified by slurrying the powder in 300 ml deionized water, adjusting the pH to 4.0 with 10 wt. % nitric acid, and maintaining the pH at 4.0 for 1 minute with dropwise addition of acid as needed. The slurry was filtered using a Buchner funnel and rinsed with three 75-ml portions of deionized water. The acidification step was repeated twice more. After the slurry was filtered for the third time and rinsed with three 75-ml portions of deionized water, the solid product was rinsed with three 75-ml portions of acetone.

Figure 11:
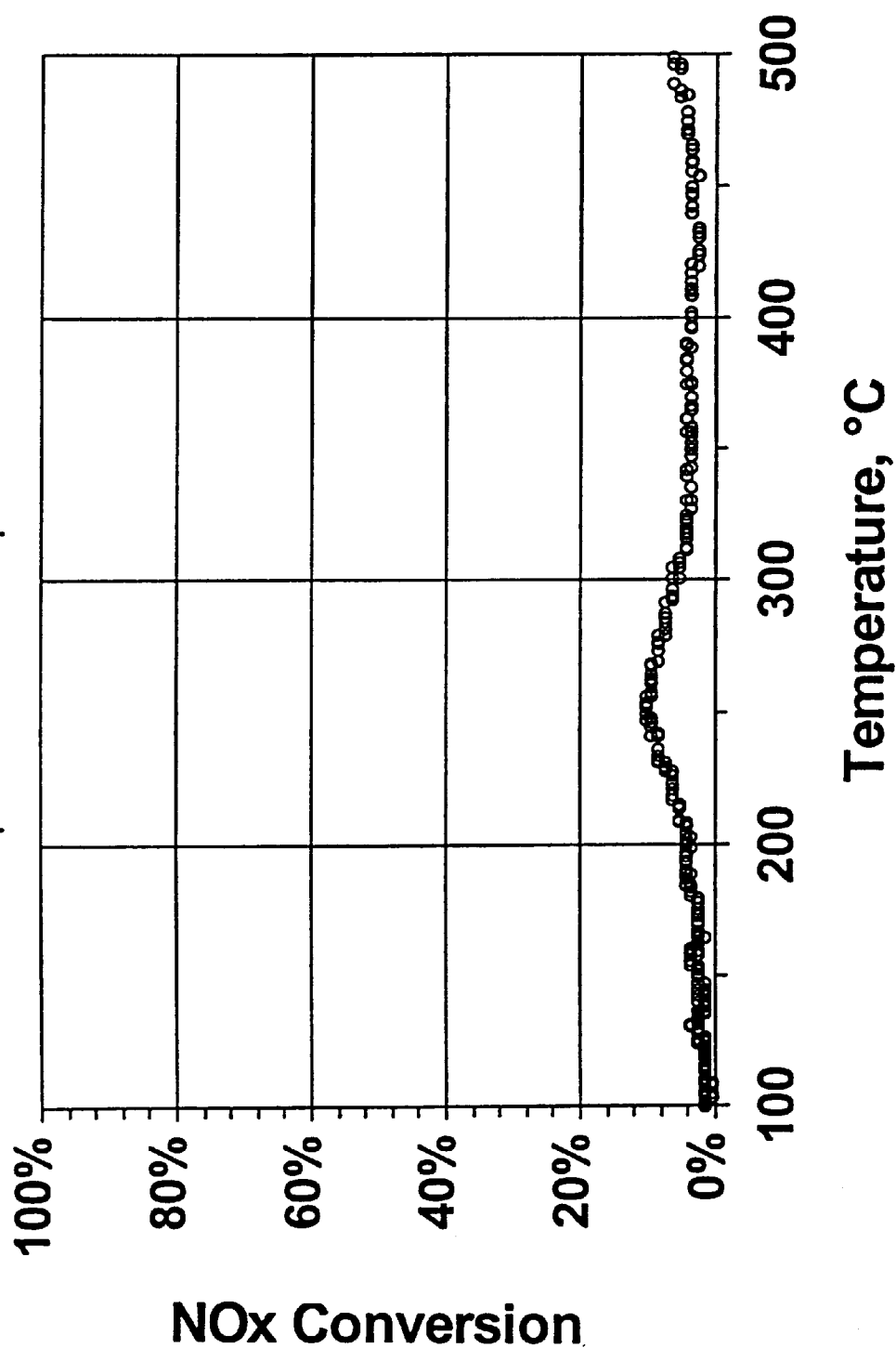

The powder was granulated to a size range of −60/+80 mesh with light grinding. Mesh fractions that were too fine were pressed into small pellets using a pressure of 12 kpsi and reground to the desired mesh. The granulated material was heated to 600° C. at a rate of 5° C./minute and calcined at that temperature for two hours in stagnant air. The prepared product was determined by atomic absorption spectrophotometry to have 3.97 wt. % copper, measured as theoretical CuO. and 0.07 wt. % Na. This material evaluated according to Method of Evaluation I and was essentially inactive for NOx reduction as shown by the $NO_x$ conversion curve in FIG. 11.

COMPARATIVE EXAMPLE B

Figure 12:
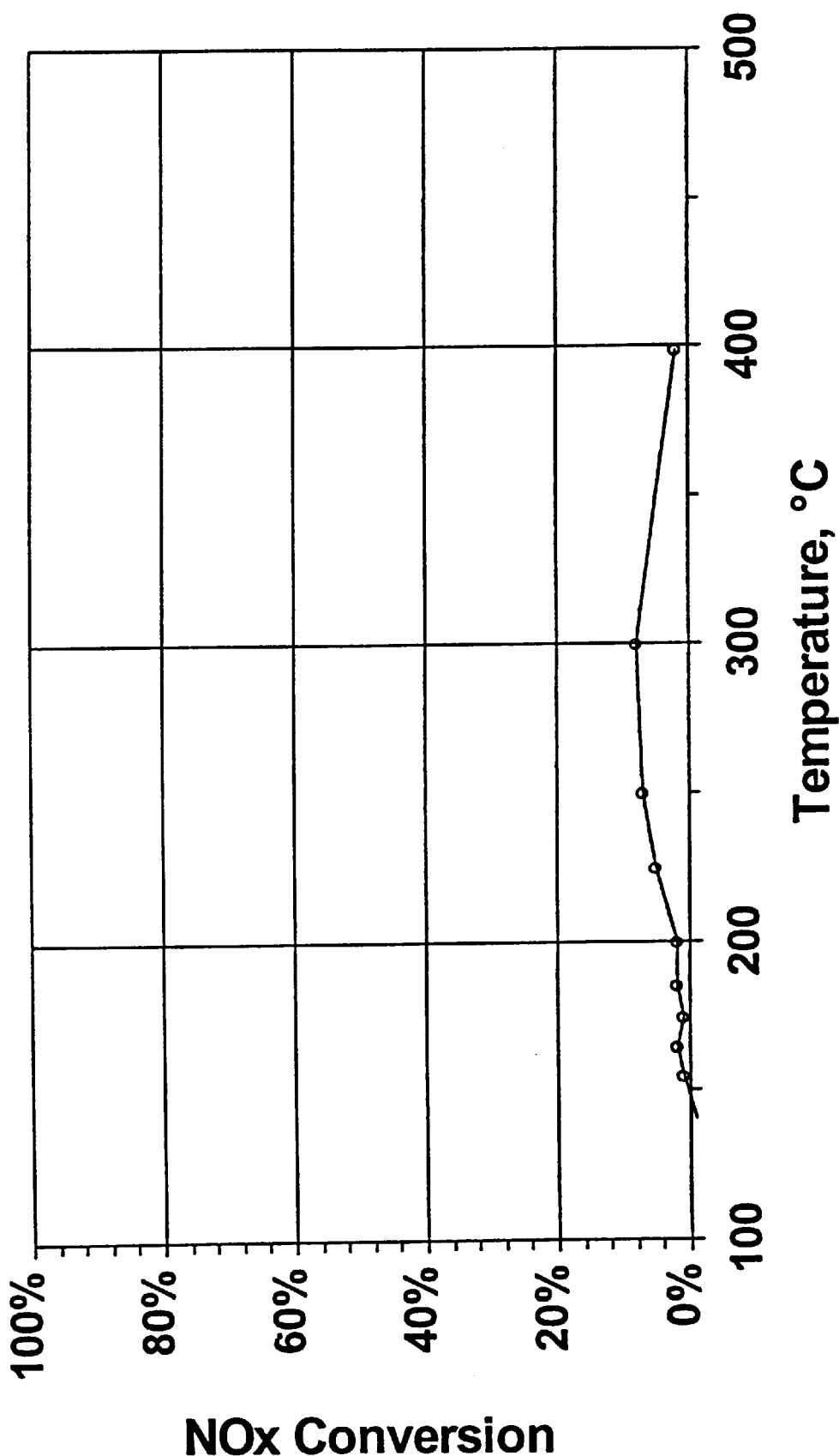

Preparation of Bulk Activated Platinum- and Copper-Doped Hydrous Titanium Oxide/Silica Material by Alternate Cation Exchange/ Impregnation Techniques 2.82 grams of granulated (−60/+80 mesh) but uncalcined platinum-doped hydrous titanium oxide/silicate powder made according to Example 2 were placed in a small Pyrex crystallizing dish. Approximately 0.31 g of $Cu(NO_3)_2.2.5$ $H_2O$ were dissolved in 2 ml of deionized $H_2O$. The aqueous $Cu(NO_3)_2$ solution was added to the platinum-doped hydrous titanium oxide/silicate granules and mixed very gently to form a uniformly coating. Following drying overnight at room temperature and then drying at 100° C. in air, the mixture was calcined at 600° C. for 2 h in stagnant air (heating rate=5° C./min). The material resulting from this preparation contained a final composition similar to that produced in Example 8, 1.0 wt. % Pt and 5.0 wt. % copper, measured as theoretical CuO, but, unlike Example 8, no calcination procedure was performed between the Pt and Cu precursor addition steps. This material had a maximum $NO_x$ conversion of 7.8% at a temperature of 300° C. This material was evaluated according to Method of Evaluation II and was relatively inactive for $NO_x$ reduction as shown by the $NO_x$ conversion curve in FIG. 12. This result is significantly different from the results obtained using the cation exchange/impregnation procedure described in Example 8.

COMPARATIVE EXAMPLE C

Figure 13:
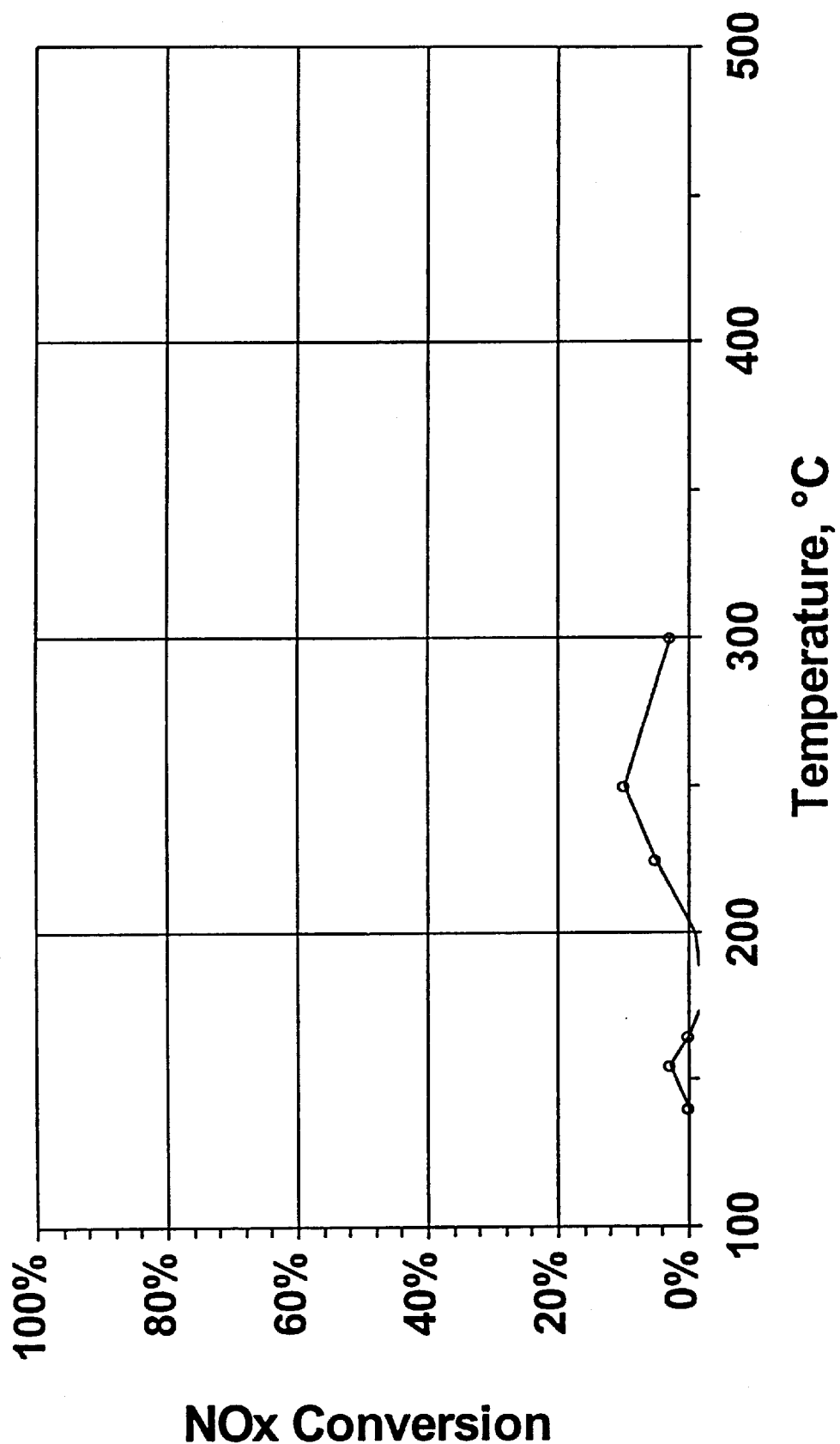

Preparation of Bulk Activated Platinum- and Copper-Doped Hydrous Titanium Oxide/Silica Material by Co-Cation Exchange Techniques A solution of 2.06 grams of $Cu(NO_3)_2.2.5$ $H_2O$ in 200 ml of deionized $H_2O$ was adjusted to a pH of 10 using 35 wt. % $NH_4OH$. As the pH increased, a light blue copper hydroxide precipitate was observed, which redissolved at higher pH to form a clear, bright blue solution. 0.28 gram of $Pt(NH_3)_4(NO_3)_2$ was added to the copper solution, with stirring used to accomplish dissolution. 22.0 grams of sodium doped hydrous titanium oxides/silica material from Preparation 1 were added and the resulting slurry was allowed to stir for 30 minutes. The slurry was filtered using a coarse porosity glass frit Buchner funnel. The collected solid material was rinsed with three 50-ml portions of deionized water. One-half of the collected solid material was redispersed in 100 ml of deionized water and acidified, granulated, and calcined using the procedures described in Example 2. The final material contained 0.98 wt. % Pt, 3.87 wt. % copper as theoretical CuO, and 0.25 wt. % Na. The overall preparation was different from that described in Example 8 in that the Pt and Cu precursors were added simultaneously and only a single calcination procedure was used. This material was evaluated according to Method of Evaluation II and was relatively inactive for $NO_x$ reduction as shown by the $NO_x$ conversion curve in FIG. 13. This material had a maximum $NO_x$ conversion of 10.3% at a temperature of 250° C. Material resulting from the unacidified portion of this preparation was also granulated, calcined, and tested. This high sodium material contained 0.86 wt. % Pt, 3.50 wt. % Cu, measured as theoretical CuO, and 7.33 wt. % Na, and was also found to be similarly inactive for $NO_x$ reduction. These results are significantly different from the results obtained using the cation exchange/impregnation procedure described in Example 8.

COMPARATIVE EXAMPLE D

Preparation of an Activated Copper-Doped Hydrous Titanium Oxide/Silica Material on a Cordierite Monolith Precoated with γ-Alumina Using a Direct Coating Method Monolith control samples were fabricated by exposing a sodium-doped hydrous titanium oxide/silica coating on a cordierite monolith precoated with γ-alumina of Preparation 3 to the cation exchange procedure described in Example 10, except that no $Pt(NH_3)_4(NO_3)_2$ was added. After calcination as described in Example 10, CuO was added by impregnating the calcined monolith with an aqueous $Cu(NO_3)_2$ solution similar to that used in Example 12. The calcined monolith was placed in a solution containing 0.06 grams of $Cu(NO_3)_2.2.5$ $H_2O$ dissolved in 5 ml of deionized water and allowed to soak overnight. After impregnation of the copper precursor, the monolith was processed similarly to that described in Example 10 in order to produce the final CuO/silica-doped hydrous titanium oxide/γ-alumina/cordierite monolith. The prepared product was determined by atomic absorption spectrometry to contain 0.88 wt. % copper on a theoretical basis of CuO. This material was evaluated using Method of Evaluation III and was totally inactive for $NO_x$ reduction ($NO_x$ conversion essentially 0% at all test temperatures). Due to these results, no significant synergism was expected when combining Pt and Cu (or CuO) together on the hydrous titanium oxide/silica-coated alumina/cordierite monolith.

COMPARATIVE EXAMPLE E

Preparation of Copper (II) Oxide Supported on a γ-Alumina/Cordierite Monolith and Activation Monolith control samples were fabricated using an aqueous $Cu(NO_3)_2$ solution impregnation procedure. By varying the $Cu(NO_3)_2$ concentration in the aqueous impregnating solution, the copper loading can be systematically varied. 0.24 grams of $Cu(NO_3)_2.2.5$ $H_2O$ was dissolved in 5 ml of deionized $H_2O$. A γ-alumina coated cordierite monolith (~0.65 grams) soaked in the copper nitrate solution for 24 hours. The monolith was then removed from the copper nitrate solution and the excess solution was removed from the monolith channels using compressed air. The monolith was dried, first at room temperature and then at 100° C. in air for two hours. The dried monolith was calcined by heating at 5° C./minute up to 600° C. and holding at that temperature for two hours in stagnant air.

The prepared product was determined by atomic absorption spectrometry to be 0.7 wt. % copper, measured as theoretical CuO. This material was evaluated according to Method of Evaluation III and was relatively inactive for $NO_x$ reduction, having a maximum $NO_x$ conversion of 3.6% at a temperature of 375° C. The $NO_x$ reduction curve is shown in FIG. 14. Copper (II) oxide loadings ranging from 0.25 to 2.3 wt. % were also fabricated using various $Cu(NO_3)_2$ concentrations in the impregnating solution All of these materials were similarly inactive for $NO_x$ reduction. Due to these results, no significant synergism was expected when combining Pt and Cu (or CuO) together on the hydrous titanium oxide/silica-coated alumina/cordierite monolith.

The invention has been described in detail with reference to preferred embodiments thereof. It should be understood, however, that variations and modifications can be made within the spirit and scope of the invention.

We claim:

1. A catalytic material, comprising an activated noble metal-doped hydrous metal oxide material having a copper promoter, wherein the noble metal is selected from the group consisting of platinum and mixtures of platinum and palladium, and further wherein the metal of the metal oxide is selected from the group consisting of titanium, zirconium, and mixtures thereof.

2. A catalytic material according to claim 1, wherein the hydrous metal oxide is hydrous titanium oxide.

3. A catalytic material according to claim 2, wherein the noble metal is platinum.

4. A catalytic material according to claim 2, wherein the noble metal is a mixture of platinum and palladium in a ratio of from about 1 to about 20 parts platinum for each part palladium, by weight.

5. A catalytic material according to claim 2, further including silica.

6. A catalytic material according to claim 2, further comprising an amount of silica effective to thermally stabilize the material for temperatures of up to about 1000° C.

7. A catalytic material according to claim 1, wherein the amount of copper promoter included is effective to broaden the temperature range of appreciable $NO_x$ reduction to a range of at least 50° C.

8. A substrate comprising a surface coating that comprises an activated noble metal-doped hydrous metal oxide material, wherein the noble metal is selected from the group consisting of platinum and mixtures of platinum and palladium, and wherein the metal of the metal oxide is selected from the group consisting of titanium, zirconium, and mixtures thereof;

wherein said activated noble metal-doped hydrous metal oxide material further comprises at least one member selected from the group consisting of sodium, copper promoter, and combinations thereof.

9. A substrate according to claim 8, wherein the activated noble metal-doped hydrous metal oxide material further comprises up to about 5% by weight sodium, based on the weight of the coated substrate.

10. A substrate according to claim 8, wherein the activated noble metal-doped hydrous metal oxide material comprises up to about 5% by weight copper promoter, based on the weight of the coated substrate.

11. A substrate according to claim 8, wherein the activated noble metal-doped hydrous metal oxide material further comprises silica.

12. A substrate according to claim 8, wherein the activated noble metal-doped hydrous metal oxide material comprises from about 0.1% to about 10% by weight copper promoter, based on the weight of the coated substrate.

13. A substrate according to claim 12, wherein the activated noble metal-doped hydrous metal oxide material comprises from about 0.2% to about 1.8% by weight platinum, based on the weight of the coated substrate.

14. A substrate according to claim 13, wherein the activated noble metal-doped hydrous metal oxide material further comprises from about 0.1% to about 0.4% palladium, based on the weight of the coated substrate.

15. A substrate according to claim 8, wherein the activated noble metal-doped hydrous metal oxide material comprises from about 0.2% to about 2% by weight copper promoter, based on the weight of the coated substrate.

16. A method of increasing the temperature range of appreciable $NO_x$ reduction in a catalytic material, comprising the steps of:

(a) making an activated noble metal-doped hydrous titanium oxide material, wherein the noble metal is selected from the group consisting of platinum and mixtures of platinum and palladium;

(b) doping the material with a copper salt; and (c) calcining the material.

17. A process for making a catalytic substrate, comprising steps of:

(a) preparing a powdered activated noble metal-doped hydrous titanium oxide material including a copper promoter, wherein the noble metal is selected from the group consisting of platinum and mixtures of platinum and palladium;

(b) forming a slurry comprising the powdered activated noble metal-doped hydrous titanium oxide material and at least one binder;

(c) coating a substrate with the slurry to form a coating layer; and (d) drying the coating layer.

18. A process according to claim 17, wherein the binder comprises γ-alumina.

19. A process according to claim 17, wherein the substrate is a cordierite monolith.

20. A process for making a catalytic substrate, comprising steps of (a) impregnating a γ-alumina coated cordierite monolith with an intermediate sol comprising a titanium alkoxide and a hydroxide compound selected from the group consisting of alkali hydroxides, alkaline earth hydroxides, and combinations thereof;

(b) hydrolyzing-the intermediate to form a hydrous titanium oxide compound;

(c) performing an ion exchange with a platinum salt;

(d) calcining the substrate;

(e) impregnating the calcined substrate with a solution of a copper salt; and (f) calcining the substrate for a second time to form substrate having thereon an activated copper-modified platinum-doped hydrous titanium oxide.

21. A method according to claim 20, wherein the intermediate sol further includes a silicon alkoxide.

22. A substrate according to claim 8, wherein the metal of the metal oxide is titanium.

23. A process according to claim 17, comprising further steps of doping the coating layer with a copper salt and calcining the coated substrate.

* * * * *

UNITED STATES PATENT AND TRADEMARK OFFICE
CERTIFICATE OF CORRECTION

PATENT NO.   : 6,165,934
DATED        : December 26, 2000
INVENTOR(S)  : T.J. Gardner et al.

It is certified that error appears in the above-identified patent and that said Letters Patent is hereby corrected as shown below:

Title page,
Item [57] ABSTRACT,
Line 5, after "form" should be -- from --.

Column 2,
Line 1, "(Oust" should be -- (just --.

Column 9,
Line 6, "a" should be -- an --.
Line 12, delete "to about".

Column 12,
Line 44, "a" should be -- an --.
Line 58, "asdescribed" should be -- as described --.

Column 20,
Line 6, "acid," should be -- acid. --.
Line 19, "weight," should be -- weight --.

Column 23,
Line 7, delete the period after "CuO."
Line 25, "uniformly" should be -- uniform --.

Column 25,
Line 2, inserty a period after "solution".

UNITED STATES PATENT AND TRADEMARK OFFICE
CERTIFICATE OF CORRECTION

PATENT NO. : 6,165,934
DATED : December 26, 2000
INVENTOR(S) : T.J. Gardner et al.

It is certified that error appears in the above-identified patent and that said Letters Patent is hereby corrected as shown below:

Column 26, claim 20,
Line 46, delete the hyphen in "-the".

Signed and Sealed this

Eighteenth Day of December, 2001

Attest:

Attesting Officer

JAMES E. ROGAN
Director of the United States Patent and Trademark Office